United States Patent
Ittamveettil et al.

(10) Patent No.: US 12,009,742 B1
(45) Date of Patent: Jun. 11, 2024

(54) FAULT CURRENT MITIGATION FOR AN ELECTRICAL POWER CONVERSION SYSTEM

(71) Applicants: General Electric Company, Schenectady, NY (US); General Electric Deutschland Holding GmbH, Frankfurt (DE)

(72) Inventors: Hridya Ittamveettil, Bengaluru (IN); Kum Kang Huh, Niskayuna, NY (US); Vandana Prabhakar Rallabandi, Knoxville, TN (US); Di Pan, Schenectady, NY (US); Rajib Datta, Niskayuna, NY (US); Mohamed Osama, Garching (DE)

(73) Assignees: General Electric Company, Schenectady, NY (US); General Electric Deutschland Holding GmbH, Frankfurt (DE)

( * ) Notice: Subject to any disclaimer, the term of this patent is extended or adjusted under 35 U.S.C. 154(b) by 0 days.

(21) Appl. No.: 18/349,245

(22) Filed: Jul. 10, 2023

(51) Int. Cl.
*H02M 1/32* (2007.01)
*B64D 27/24* (2006.01)

(52) U.S. Cl.
CPC .......... *H02M 1/325* (2021.05); *B64D 27/24* (2013.01); *H02J 2310/44* (2020.01)

(58) Field of Classification Search
None
See application file for complete search history.

(56) References Cited

U.S. PATENT DOCUMENTS

| | | | |
|---|---|---|---|
| 5,523,938 A | 6/1996 | Wagner et al. | |
| 6,320,771 B1 | 11/2001 | Hemena et al. | |
| 6,825,640 B1 | 11/2004 | Hill et al. | |
| 10,640,000 B2 | 5/2020 | Eckert et al. | |
| 2017/0166316 A1* | 6/2017 | Zhou | B64D 27/24 |
| 2019/0283889 A1* | 9/2019 | Dong | B64D 27/24 |
| 2023/0155371 A1* | 5/2023 | Mysore | H02H 3/40 |
| | | | 363/95 |

FOREIGN PATENT DOCUMENTS

| | | |
|---|---|---|
| DE | 2429446 A1 | 1/1976 |
| DE | 2851381 A1 | 8/1979 |
| DE | 102013200803 A1 | 8/2014 |
| GB | 2566059 A | 3/2019 |

* cited by examiner

*Primary Examiner* — Jared Fureman
*Assistant Examiner* — Aqeel H Bukhari
(74) *Attorney, Agent, or Firm* — Dority & Manning, P.A.

(57) ABSTRACT

An electric power conversion system comprising: an alternating current (AC) source comprising a plurality of AC terminals for conducting AC power; a voltage source electrically coupled to the AC terminals; and a controller operably coupled to the voltage source, the controller being configured to: operate the voltage source to apply a fault reducing voltage at the AC terminals that reduces an AC line-to-line fault current ($I_f$).

19 Claims, 16 Drawing Sheets

FAULT CURRENT MITIGATION FOR AN ELECTRICAL POWER CONVERSION SYSTEM

FIELD

The present subject matter relates generally to electrical power systems, such as electrical power systems for aircraft.

BACKGROUND

A conventional commercial aircraft generally includes a fuselage, a pair of wings, and a propulsion system that provides thrust. The propulsion system typically includes at least two aircraft engines, such as turbofan jet engines. Each turbofan jet engine is typically mounted to a respective one of the wings of the aircraft, such as in a suspended position beneath the wing separated from the wing and fuselage.

Electric and hybrid-electric propulsion systems are being developed to improve an efficiency of conventional commercial aircraft. Such propulsion systems can include an electric machine or generator that produces three-phase alternating current (AC) power. This AC power may be fed through an AC/DC converter to convert the power to direct current (DC) and to regulate the voltage supplied to an external load.

Notably, electric and hybrid-electric propulsion systems may occasionally experience electrical faults. For example, alternating current (AC) line-to-line faults may occur within the electric machine or power generator, between the power generator and an AC/DC converter, or at other locations within the propulsion system, and such faults may cause very high fault current to flow between the faulted terminals. This could heat the conductor in the fault path and lead to complete failure of the system or even fire. Mitigating these electrical faults has presented certain challenges.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
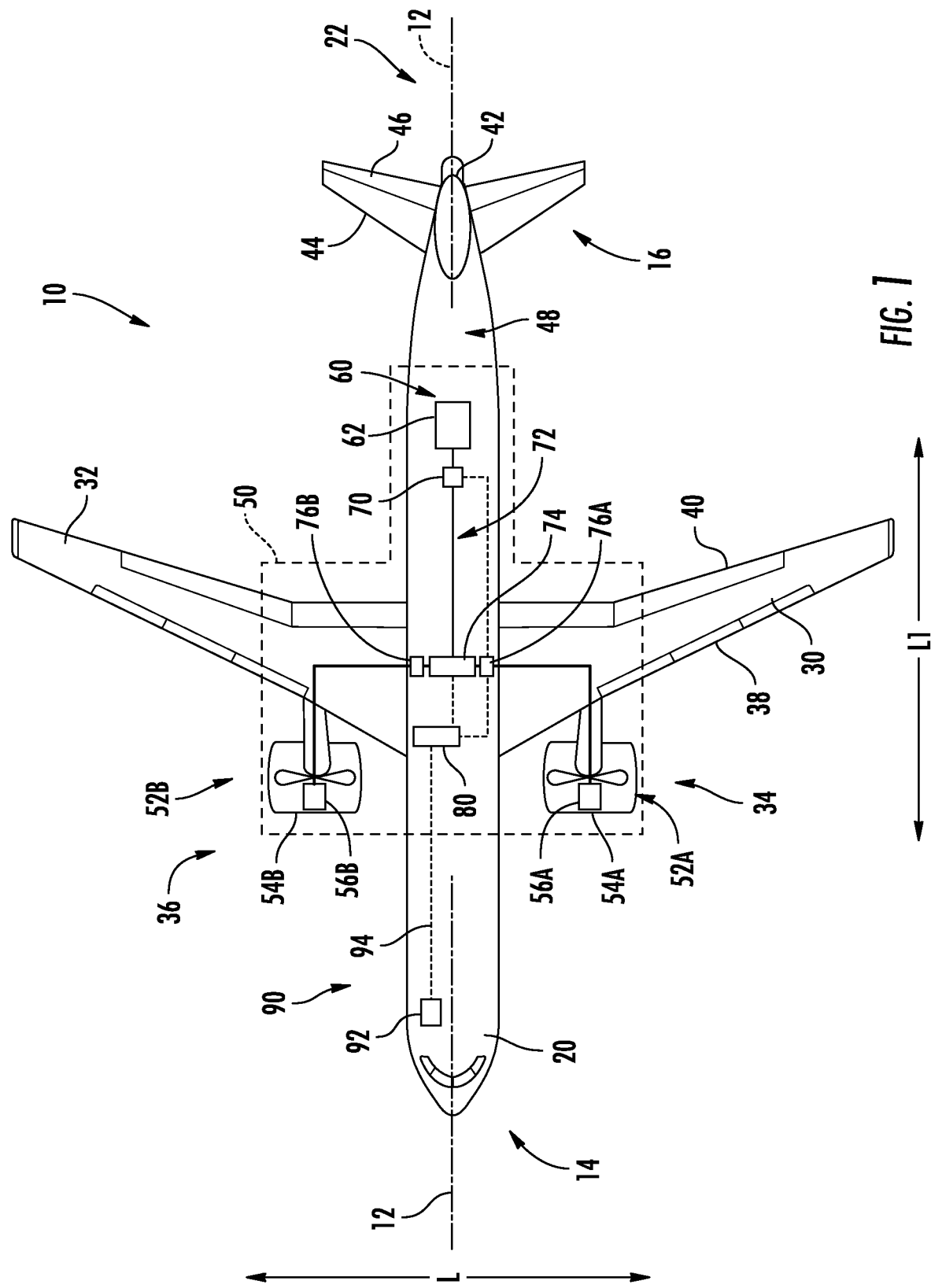
FIG. 1 provides a schematic top view of an aircraft having a hybrid-electric propulsion system according to various exemplary embodiments of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). The term "at least one of" in the context of, e.g., "at least one of A, B, and C" refers to only A, only B, only C, or any combination of A, B, and C. In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the disclosure, not limitation of the disclosure. In fact, it will be apparent to those skilled in the art that various modifications and variations can be made in the present disclosure without departing from the scope of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust. The terms "upstream" and "downstream" refer to the relative direction with respect to a flow in a pathway. For example, with respect to a fluid flow, "upstream" refers to the direction from which the fluid flows, and "downstream" refers to the direction to which the fluid flows. However, the terms "upstream" and "downstream" as used herein may also refer to a flow of electricity.

The present disclosure is generally related to electrical power systems, such as those found in aircraft hybrid-electric and electric propulsion systems. More specifically these power generation-distribution systems can include an electric machine or generator that produces three-phase alternating current (AC) power, e.g., to take in power from a battery or to give out power to a load. This AC power may be fed through an AC/DC converter to convert the power to direct current (DC) and to regulate the voltage supplied to an external load. Embodiments of the present subject matter may not be limited to power generation systems but could include any system having a machine and a power converter. For example, the electric machine may operate as a motor or a generator, the system could operate with three-phase or single-phase power, etc. Notably, electric and hybrid-electric propulsion systems may occasionally experience electrical faults. For example, alternating current (AC) line-to-line faults within a power generator or between the power generator and an AC/DC converter may cause very high fault current to flow between the faulted terminals. This could heat the conductor in the fault path over a period that could lead to complete failure of the system or even fire.

Mitigating these electrical faults has presented certain challenges. In this regard, one way to overcome these electrical faults may include cutting the shaft of the electric machine from the prime mover (e.g., a driveshaft of a gas turbine engine) as it can prevent the electric machine from feeding fault. In a multi-winding generator system, shaft cutting may make the system less reliable as the fault tolerant capability provided by the other winding sets are also impacted. Also, due to inertia, the electric machine may still run and feed the electrical fault as the machine rotates. Accordingly, a system and method of operation designed to mitigate electrical faults in electric and hybrid-electric propulsion systems (or any other system including a machine and a converter) would be a welcome addition to the art.

Accordingly, aspects of the present subject matter provide a control solution that could bring down the fault current to acceptable values without cutting the machine shaft. For example, aspects of the present subject matter are directed to an active scheme to bring down the fault current, e.g., by driving the negative sequence converter current to zero, thereby ensuring that the electric machine current is bypassed to the converter instead of the faulted path. In this manner, the fault current and the machine torque oscillation may be reduced significantly or eliminated altogether. According to exemplary embodiments, the proposed methods may utilize a power converter to maintain the converter voltage at both the AC link and the DC link for fault current elimination.

The power systems provided herein and the methods of controlling these systems may provide certain advantages and benefits. For instance, as noted above and herein, the proposed control methods may eliminate many problems or dangers associated with line-to-line (L-L) faults, such as heating, arcing, fire, and explosion. Moreover, the proposed solution does not require generator shaft cutting, slowing down or stopping motor rotation, or disconnecting the electrical machine terminals using a switch or circuit breaker. In addition, the fault tolerance provided by the multi-winding generator system may not be impacted. Using this control method, machine torque oscillation may be reduced in steady state as the unbalance in machine currents is reduced. Moreover, the proposed method does not require any additional sensors. The power systems provided herein may provide other advantages and benefits not expressly noted herein.

Referring now to the drawings, wherein identical numerals indicate the same elements throughout the figures, FIG. 1 provides a schematic top view of an exemplary aircraft 10 as may incorporate one or more inventive aspects of the present disclosure. As shown in FIG. 1, for reference, the aircraft 10 defines a longitudinal direction L1 and a lateral direction L2. The lateral direction L2 is perpendicular to the longitudinal direction L1. The aircraft 10 also defines a longitudinal centerline 12 that extends therethrough along the longitudinal direction L1. The aircraft 10 extends between a forward end 14 and an aft end 16, e.g., along the longitudinal direction L1.

As depicted, the aircraft 10 includes a fuselage 20 that extends longitudinally from the forward end 14 of the aircraft 10 to the aft end 16 of the aircraft 10. The aircraft 10 also includes an empennage 22 at the aft end 16 of the aircraft 10. In addition, the aircraft 10 includes a wing assembly including a first, port side wing 30 and a second, starboard side wing 32. The first and second wings 30, 32 each extend laterally outward with respect to the longitudinal centerline 12. The first wing 30 and a portion of the fuselage 20 together define a first side 34 of the aircraft 10 and the second wing 32 and another portion of the fuselage 20 together define a second side 36 of the aircraft 10. For the embodiment depicted, the first side 34 of the aircraft 10 is configured as the port side of the aircraft 10 and the second side 36 of the aircraft 10 is configured as the starboard side of the aircraft 10.

The aircraft 10 includes various control surfaces. For this embodiment, each wing 30, 32 includes one or more leading edge flaps 38 and one or more trailing edge flaps 40. The aircraft 10 further includes, or more specifically, the empennage 22 of the aircraft 10 includes a vertical stabilizer 42 having a rudder flap (not shown) for yaw control and a pair of horizontal stabilizers 44 each having an elevator flap 46 for pitch control. The fuselage 20 additionally includes an outer surface or skin 48. It should be appreciated that, in other exemplary embodiments of the present disclosure, the aircraft 10 may additionally or alternatively include any other suitable configuration. For example, in other embodiments, the aircraft 10 may include any other control surface configuration.

The exemplary aircraft 10 of FIG. 1 also includes a hybrid-electric propulsion system 50. For this embodiment, the hybrid-electric propulsion system 50 has a first propulsor 52A and a second propulsor 52B both operable to produce thrust. The first propulsor 52A is mounted to the first wing 30 and the second propulsor 52B is mounted to the second wing 32. Moreover, for the embodiment depicted, the first propulsor 52A and second propulsor 52B are each configured in an underwing-mounted configuration. However, in other example embodiments, one or both of the first and second propulsors 52A, 52B may be mounted at any other suitable location in other exemplary embodiments.

The first propulsor 52A includes a first gas turbine engine 54A and one or more electric machines, such as a first electric machine 56A mechanically coupled with the gas turbine engine 54A. The first electric machine 56A can be directly mechanically coupled to a shaft of the first gas turbine engine 54A or indirectly via a gearbox, for example. The first electric machine 56A can be an electric generator, an electric motor, or a combination generator/motor. For this example embodiment, the first electric machine 56A is a combination generator/motor. In this manner, when operating as an electric generator, the first electric machine 56A can generate electrical power when driven by the gas turbine engine 54A. When operating as an electric motor, the first electric machine 56A can drive or motor the first gas turbine engine 54A. The first gas turbine engine 54A can be any suitable type of gas turbine engine, including a turbofan, turbojet, turboprop, turboshaft, etc.

Likewise, the second propulsor 52B includes a second gas turbine engine 54B and one or more electric machines, such as a second electric machine 56B mechanically coupled with the second gas turbine engine 54B. The second electric machine 56B can be directly mechanically coupled to a shaft of the second gas turbine engine 54B or indirectly via a gearbox, for example. The second electric machine 56B can be an electric generator, an electric motor, or a combination generator/motor. For this example embodiment, the second electric machine 56B is a combination generator/motor. In this manner, when operating as an electric generator, the second electric machine 56B can generate electrical power when driven by the gas turbine engine 54B. When operating as an electric motor, the second electric machine 56B can drive or motor a spool of the gas turbine engine 54B. The second electric machine 56B can be configured and can operate in a similar manner as first electric machine 56A described herein. The second gas turbine engine 54B can be any suitable type of gas turbine engine, including a turbofan, turbojet, turboprop, turboshaft, etc.

The hybrid-electric propulsion system 50 further includes an electric energy storage system 60. The electric energy storage system 60 can include one or more electric energy storage devices, such as batteries, supercapacitor arrays, one or more ultracapacitor arrays, some combination of the foregoing, etc. For instance, for this embodiment, the electric energy storage system 60 includes a battery 62. The battery 62 is electrically coupled with a DC/DC converter 70 or voltage-regulating power supply. In some embodiments, the DC/DC converter 70 can be a bidirectional DC/DC converter. In this regard, the DC/DC converter 70 can control the electrical power drawn from the battery 62 and the electrical power provided to the battery 62 depending on whether it is desired to discharge or charge the battery 62. The DC/DC converter 70 is electrically coupled with a power bus 72.

A power distribution unit 74 is positioned along the power bus 72. The power distribution unit 74 can be controlled to distribute electrical power to various loads of the aircraft 10. For instance, electrical power drawn from the battery 62 can be directed to the power distribution unit 74 across the power bus 72, and the power distribution unit 74 can distribute the electrical power to various aircraft loads, such as the first electric machine 56A and/or the second electric machine 56B. A first AC/DC converter 76A (or first DC/AC converter) associated with the first electric machine 56A can be positioned along the power bus 72 for converting direct current into alternating current or vice versa. Similarly, a second AC/DC converter 76B (or second DC/AC converter) associated with the second electric machine 56B can be positioned along the power bus 72 for converting direct current into alternating current or vice versa. The first AC/DC converter 76A and the second AC/DC converter 76B can both be bidirectional converters.

The power distribution unit 74 and other controllable electrical elements of the hybrid-electric propulsion system 50 can be managed by a power management system. The power management system can include a supervisor controller 80 operable to control or provide data to the power distribution unit 74 and the DC/DC converter 70, among other elements. The DC/DC converter 70 can include a controller operable to receive inputs from the supervisor controller 80, and based on such inputs, the controller can cause the switching elements of the DC/DC converter 70 to perform a duty cycle, for example.

As further shown in FIG. 1, the supervisor controller 80 can form a part of a computing system 90 of the aircraft 10. The computing system 90 of the aircraft 10 can include one or more processors and one or more memory devices embodied in one or more computing devices. For instance, as depicted in FIG. 1, the computing system 90 includes the supervisor controller 80 as well as other computing devices, such as computing device 92. The computing system 90 can include other computing devices as well, such as engine controllers (not shown). The computing devices of the computing system 90 can be communicatively coupled with one another via a communication network. For instance, computing device 92 is located in the cockpit of the aircraft 10 and is communicatively coupled with the supervisor controller 80 of the hybrid-electric propulsion system 50 via a communication link 94 of the communication network. The communication link 94 can include one or more wired or wireless communication links.

For this embodiment, the computing device 92 is configured to receive and process inputs, e.g., from a pilot or other crew members, and/or other information. In this manner, as one example, the one or more processors of the computing device 92 can receive an input indicating a command to change a thrust output of the first and/or second propulsors 52A, 52B. In response to the input, the supervisor controller 80 can manage the electrical power drawn from the battery 62 by controlling or providing data to the controller of the DC/DC converter 70, as well as managing the power distribution unit 74 and AC/DC converters 76A, 76B to distribute and supply the electrical power needed to meet the power demands of the electric machines 56A, 56B. In this way, the electric machines 56A, 56B can drive their respective gas turbine engines 54A, 54B to ultimately change the thrust output of one or both of the propulsors 52A, 52B.

While the aircraft 10 depicted in FIG. 1 includes the hybrid-electric propulsion system 50, it will be appreciated that the inventive aspects of the present disclosure can apply equally to fully electric propulsion systems. Moreover, the inventive aspects of the present disclosure can apply to other electrical power systems outside of the aviation industry that include a voltage source, such as a battery, and a power converter supply electrically coupled thereto. Indeed, aspects of the present subject matter are applicable to any system including an electric machine and a power converter.

Figure 2:
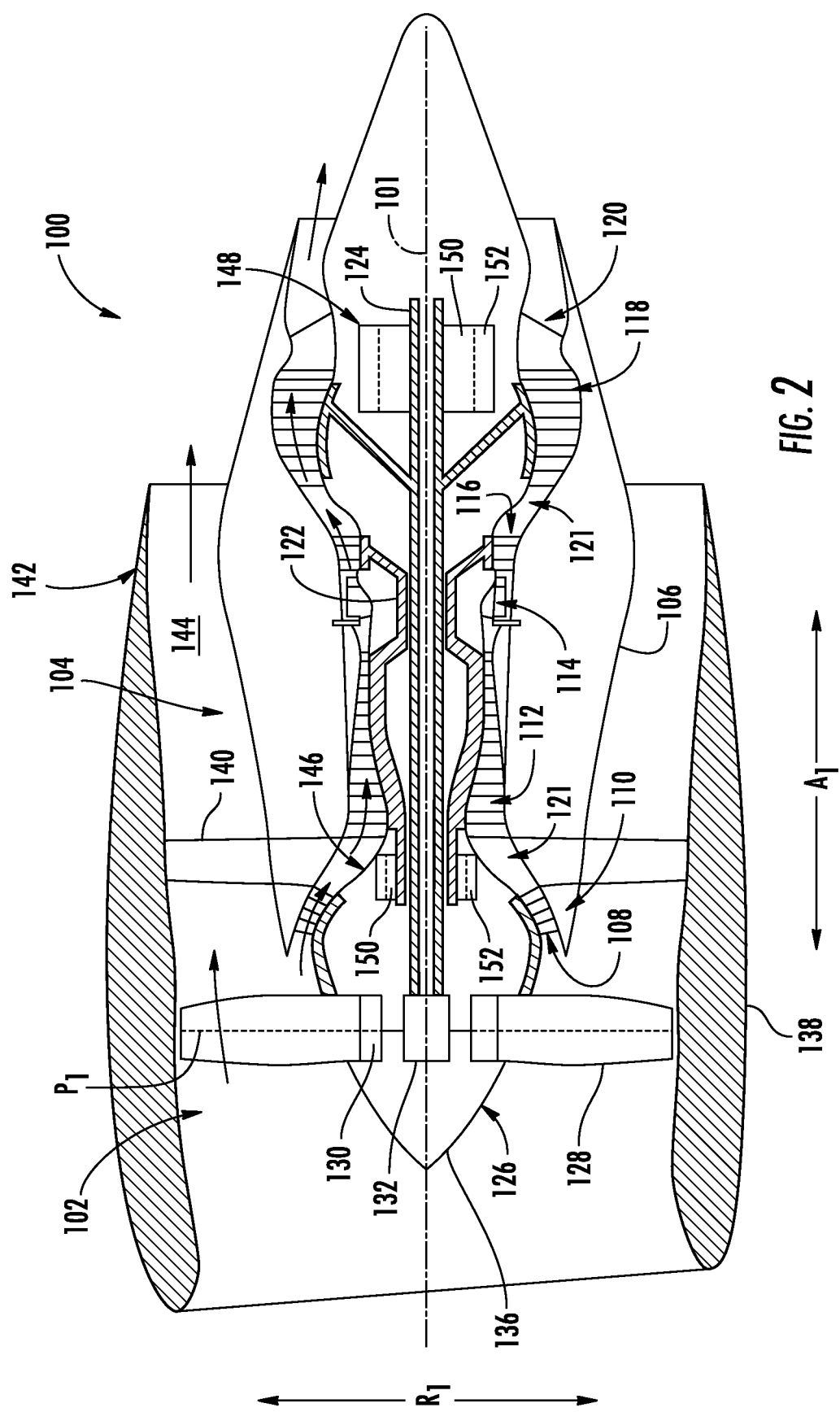
FIG. 2 provides a schematic, cross-sectional view of a gas turbine engine that may be used with the exemplary aircraft of FIG. 1.

As explained above, the exemplary aircraft 10 of FIG. 1 includes a propulsion system 50 having a first propulsor assembly 52A and a second propulsor assembly 52B. Referring now also to FIG. 2, a schematic, cross-sectional view of the first propulsor assembly 52A is provided according to an exemplary embodiment. It should be appreciated that second propulsor assembly 52B may be the same as or similar to first propulsor assembly 52A, each of which may be configured as underwing mounted propulsor assemblies. In general, first propulsor assembly 52A may be generally configured as a turbofan engine 100. As shown in FIG. 2, the turbofan engine 100 defines an axial direction A1 (extending parallel to a longitudinal centerline 101 provided for reference), a radial direction R1, and a circumferential direction C (extending about the axial direction A1; not depicted in FIG. 2).

In general, the turbofan engine 100 includes a fan section 102 and a core turbine engine 104 disposed downstream from the fan section 102. The exemplary core turbine engine 104 depicted generally includes a substantially tubular outer casing 106 that defines an annular inlet 108. The outer casing 106 encases, in serial flow relationship, a compressor section including a booster or low pressure (LP) compressor 110 and a high pressure (HP) compressor 112; a combustion section 114; a turbine section including a high pressure (HP) turbine 116 and a low pressure (LP) turbine 118; and a jet exhaust nozzle section 120. The compressor section, combustion section 114, and turbine section together define a core air flowpath 121 extending from the annular inlet 108 through the LP compressor 110, HP compressor 112, combustion section 114, HP turbine section 116, LP turbine section 118 and jet nozzle exhaust section 120. A high pressure (HP) shaft or spool 122 drivingly connects the HP turbine 116 to the HP compressor 112. A low pressure (LP) shaft or spool 124 drivingly connects the LP turbine 118 to the LP compressor 110.

For the embodiment depicted, the fan section 102 may include a fixed or variable pitch fan 126 having a plurality of fan blades 128 coupled to a disk 130 in a spaced apart manner. As depicted, the fan blades 128 extend outwardly from disk 130 generally along the radial direction R1. For the variable pitch fan embodiment, each fan blade 128 is rotatable relative to the disk 130 about a pitch axis P1 by virtue of the fan blades 128 being operatively coupled to a suitable actuation member 132 configured to collectively vary the pitch of the fan blades 128 in unison. The fan blades 128, disk 130, and actuation member 132 are together rotatable about the longitudinal axis 12 by LP shaft 124.

Referring still to the exemplary embodiment of FIG. 2, the disk 130 is covered by rotatable front hub 136 aerodynamically contoured to promote an airflow through the plurality of fan blades 128. Additionally, the exemplary fan section 102 includes an annular fan casing or outer nacelle 138 that circumferentially surrounds the fan 126 and/or at least a portion of the core turbine engine 104. The nacelle 138 is supported relative to the core turbine engine 104 by a plurality of circumferentially-spaced outlet guide vanes 140. A downstream section 142 of the nacelle 138 extends over an outer portion of the core turbine engine 104 so as to define a bypass airflow passage 144 therebetween.

Additionally, the exemplary turbofan engine 100 depicted includes a first electric machine and a second electric machine. For the embodiment shown, the first electric machine is rotatable with the LP shaft 124 and fan 126, and the second electric machine is rotatable with the HP shaft 122. In such a manner, it will be appreciated that for the embodiment shown, the first electric machine is an HP electric machine 146 and the second electric machine is an LP electric machine 148.

Specifically, for the embodiment depicted, the HP electric machine 146 is configured as an electric generator co-axially mounted to and rotatable with the HP shaft 122. As used herein, "co-axially" refers to the axes being aligned. The HP electric machine 146 is also positioned inward of the core air flowpath 121, but within compressor section of the turbofan engine 100, and as such may also be referred to as an embedded electric machine. Similarly, for the embodiment depicted, the LP electric machine 148 is configured as an electric generator co-axially mounted to and rotatable with the LP shaft 124. Moreover, for the embodiment shown, the LP electric machine 148 is positioned inward of the core air flowpath 121 within or aft of the turbine section of the turbofan engine 100, and as such may be referred to as an embedded electric machine. The LP electric machine 148 and the HP electric machine 146 each include a rotor 150 and a stator 152. The LP electric machine 148 and the HP electric machine 146 may be configured in accordance with one or more of the exemplary electric machines described herein.

It should be appreciated, however, that in other embodiments, an axis of the LP electric machine 148 and/or the HP electric machine 146 may be offset radially from the axes of the LP shaft 124 and HP shaft 122, respectively, and further the LP electric machine 148 and/or the HP electric machine 146 may be oblique to the axes of the LP shaft 124 and HP shaft 122, respectively. Further, in one or more exemplary embodiments, the LP electric machine 148 and/or the HP electric machine 146 may be located outward of the core air flowpath 121, e.g., within the casing 106 of the turbofan engine 100 or nacelle 138. Moreover, although the LP electric machine 148 and the HP electric machine 146 are described above as electric generators, in certain exemplary embodiments one or both of the LP electric machine 148 and the HP electric machine 146 may be configured as an electric motor or may be switched between an electric generator mode and an electric motor mode.

Further, it should also be appreciated that the exemplary turbofan engine 100 depicted in FIG. 2 is provided by way of example only, and that in other exemplary embodiments, the turbofan engine 100 may have any other suitable configuration. For example, in other exemplary embodiments, the turbofan engine 100 may be configured as a turboprop engine, a turbojet engine, a differently configured turbofan engine, an unducted turbofan engine (e.g., without the nacelle 138, but including the stationary outlet guide vanes 140), or any other suitable gas turbine engine. For example, the gas turbine engine may be a geared gas turbine engine (e.g., having a reduction gearbox between the LP shaft 124 and fan 126), may have any other suitable number or configuration of shafts/spools (e.g., may include an intermediate speed shaft/turbine/compressor), etc.

Referring still to FIGS. 1 and 2, although not depicted in FIG. 2, the propulsion system 50 may additionally include an electrical power connection assembly or power distribution unit 74 to allow the LP and HP electric machines 148, 146 to be in electrical communication with one or more other components of the propulsion system 50 and/or the aircraft 10. For the embodiment depicted, the power distribution unit 74 includes one or more electrical cables or lines connected to the LP and HP electric machines 148, 146, which may extend from the LP and HP electric machines 148, 146 through one or more of the outlet guide vanes 140. In general, the electrical power bus 72 is configured as a high-voltage electrical power bus, such that the propulsion system 50 may generally operate with relatively high voltages.

Additionally, the propulsion system 50 depicted further includes one or more energy storage devices 62 (such as one or more batteries or other electrical energy storage devices) electrically connected to the electrical power connection assembly 58 for, e.g., providing electrical power to the second propulsor assembly 52B and/or receiving electrical power from an electric generator. Inclusion of the one or more energy storage devices 62 may provide performance gains and may increase a propulsion capability of the propulsion system 50 during, e.g., transient operations. More specifically, the propulsion system 50 including one or more energy storage devices 62 may be capable of responding more rapidly to speed change demands.

Figure 3:
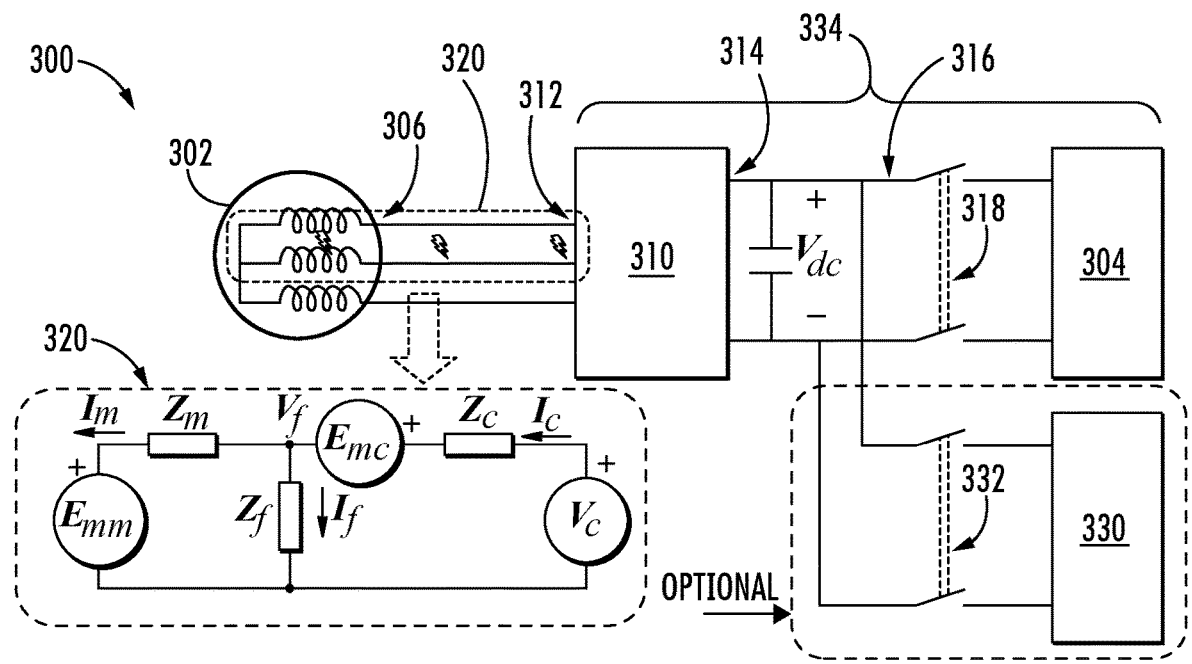
FIG. 3 provides a schematic representation of a power generation-distribution system that may be used with the exemplary hybrid-electric propulsion system of FIG. 1 according to exemplary embodiments of the present subject matter.

Referring now specifically to FIG. 3, a power distribution system 300 will be described according to exemplary embodiments of the present subject matter. As explained herein, power distribution system 300 may be generally configured for regulating electricity generated by an electric machine 302 and supplied to an electric load 304. Although identified herein as power distribution system 300, it should be appreciated that system 300 may be alternatively referred to as an electric power conversion system, e.g., emphasizing the ability of this system to operate in a motoring or generating mode (e.g., for regulating faults within an AC current system). For example, power distribution system 300 may be used as part of hybrid electric propulsion system 50 within aircraft 10. Although electric machine 302 is described herein as operating in a generator mode (e.g., to generate electricity using mechanical energy imparted by a prime mover), it should be appreciated that electric machine 302 may alternatively operate as an electric motor or a combination generator/motor. In this regard, electric load 304 may act as an electrical load when electric machine 302 is operating in a generating mode and may act as an electrical power supply when electric machine 302 is operating as a motor. For example, this electric load 304 may include an entire external electrical system, can include power sources, can include power loads, or may include both power sources and loads.

According to exemplary embodiments, electric machine 302 may be one or both of first electric machine 56A and second electric machine 56B, which may be used to generate electricity during the operation of first gas turbine engine 54A and second gas turbine engine 54B, respectively. Similarly, referring to FIG. 2, electric machine 302 may be HP electric machine 146 or LP electric machine 148. As illustrated in FIG. 3, during operation, electric machine 302 generates three-phase AC power at its output terminals 306, denoted herein by phases a, b, and c. For example, the output of electric machine may be identified herein as the stationary frame three-phase power ($P_{abc}^s$ or $P_a^s$, $P_b^s$, and $P_c^s$), voltage ($v_{abc}^s$ or $v_a^s$, $v_b^s$, and $v_c^s$), and current ($i_{abc}^s$ or $i_a^s$, $i_b^s$, and $i_c^s$). For example, these terms or variables may refer generally to the instantaneous sensed values represented in the stationary reference frame. It should be appreciated that although a three-phase AC system is described herein according to an example embodiment, the present subject matter may also be applicable to any machine, e.g., including 1-phase, 2-phase power systems, or multi-phase power systems.

In general, power distribution system 300 includes a power converter 310 that is electrically coupled to the AC output terminals 306 for converting the AC power to direct current (DC) power, or vice versa. In this regard, power converter 310 may be an AC/DC converter and may include any suitable combination of power electronics or other devices suitable for regulating the AC power from electric machine 302 for use as DC power by external load 304 (or for regulating the DC power from external electrical system, e.g., identified in the figures as external load 304, for use as AC power by the electric machine 302, e.g., in a motoring mode). For example, power converter 310 may be electrically coupled to electric machine 302 at an AC link 312 for receiving AC power. Power converter 310 may convert this AC power to DC power that is output from power converter 310 by a DC link (identified generally by reference numeral 314) to a DC power bus 316 that is electrically coupled to external load 304 or other components within power distribution system (e.g., such as batteries 62). According to example embodiments, external load 304 may be a load, another power converter, a power supply, a battery, etc. Although power converter 310 is described herein and illustrated in the figures as an AC/DC converter, it should be appreciated that the present disclosure is not limited to such an example embodiment. For example, according to alternative embodiments, power converter 310 could instead be an AC/AC converter, DC power bus 316 could be an AC power bus for conducting AC power, and external DC power source 330 could be an AC source.

According to the illustrated embodiment, DC power bus 316 may be electrically coupled to external load 304 (or another suitable source or electrical system) through a primary contact circuit 318. In general, primary contact circuit 318 may be any suitable electrical switch or regulating device suitable for selectively coupling or decoupling external load 304 to DC power bus 316. In this manner, external load 304 may be selectively isolated from DC power bus 316. According to exemplary embodiments, the electric machine power, voltage, and/or current may be sensed within power converter 310 (or at any other suitable location within power distribution system 300). A line-line fault could be detected by monitoring the currents in the distribution system 300 or the vibration caused due to torque pulsation. The currents sensed could be just one among the power converter 310 current and machine side current 302 or both the currents.

As described in more detail below, power distribution system 300 may further include an external power source 330 that is generally configured for maintaining the DC link 314 voltages generated by power converter for reasons described in more detail below. According to exemplary embodiments, power source 330 may be a low voltage power source sized for mitigating fault currents and may be electrically coupled to DC power bus 316. More specifically, according to the illustrated embodiment, power source 330 may be electrically coupled to DC power bus 316 through an auxiliary contact circuit 332. In general, auxiliary contact circuit 332 may be any suitable electrical switch or regulating device suitable for selectively coupling or decoupling power source 330 to DC power bus 316. According to still other embodiments, external power source 330 may not be needed and may be completely optional or removed from power distribution system 300. In general, external load 304, power converter 310, DC power bus 316, and/or external DC power source 330 may be replaced by any suitable voltage source for reducing/eliminating fault current. Accordingly, these components may be referred to herein generally as a voltage source 334, as shown for example in FIG. 3. According to the example embodiment described herein, voltage source 334 includes DC power bus 316 and an AC/DC power converter 310. However, as noted above, according to alternative embodiments, voltage source 334 could alternatively include an AC power source, an AC/AC converter, an external AC power source, etc.

According to the illustrated embodiment, power source 330 may be a DC power source directly providing electrical power to maintain the voltage of the DC power bus 316. However, it should be appreciated that according to other example embodiments, power source 330 may be any suitable AC/DC converter, a DC/DC converter, a battery, a fuel cell, or any other suitable source of DC power capable of facilitating the methods and control schemes described herein. Moreover, it should be appreciated that according to example embodiments, the DC link voltage could be maintained by power source 330 and/or external load 304, e.g., such that if external load 304 is not available, then only power source 330 may be used to maintain the DC link voltage. It should be appreciated that although external load 304 is illustrated in the figures, this external load 304 may include any suitable load, electrical system, AC or DC source, etc.

According to example embodiments, the DC link voltage may be maintained through operation of power converter 310 and/or an external power source (e.g., power source 330 or external load 304), e.g., based upon a voltage command from a system controller or computing system. In general, it is preferable to maintain a low value of DC link voltage to reduce the ripple current components in the fault current and hence losses in power converter 310 and thus power distribution system 300. According to example embodiments, the reference value for the DC link voltage can be set to meet commanded power converter voltages. For example, this DC link voltage may be relatively low for fault locations near power converter 310 and relatively higher as the fault location moves closer to the terminals of electric machine 302. According to an example embodiment, power converter 310 can determine the DC link voltage requirement based on the voltage command generated through controller, e.g., based on any suitable predetermined algorithm, look-up tables, mathematical relationships, or any other predetermined relationship that is empirical, theoretical, etc.

According to example embodiments, the voltage required by the power converter 310 for active mitigation could be derived using any suitable methods. For example, the voltage required may be determined based on the control of negative sequence components of converter three phase currents (or machine three-phase currents). In this regard, by applying balanced converter terminal voltages, low torque oscillation and low DC link voltage oscillation may be obtained. Alternatively, the voltage required may be determined based on the control of fault current. In this regard, by applying line-line voltage just on the faulty line pair (in other words by applying unbalanced converter terminal voltage), this may produce pulsating torque and DC link voltage oscillation.

Figure 22:
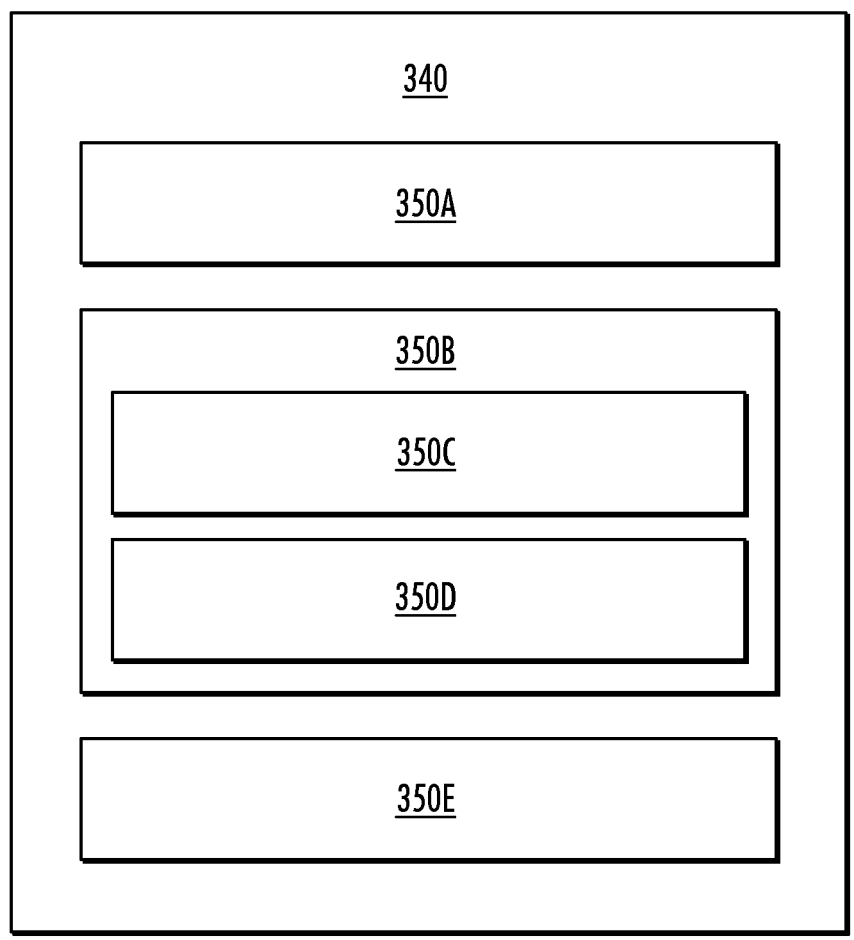
FIG. 22 illustrates a system diagram of a computing system of the power generation-distribution system of FIG. 3.

As further shown in FIGS. 3 and 22, power distribution system 300 includes a computing system 340. Computing system 340 can include one or more processors and one or more memory devices, which may be embodied in one or more computing devices. For instance, computing system 340 can include a controller associated with power converter 340. The controller can cause one or more switching devices of power converter 310 to switch or modulate according to a switching scheme, for example. Components of computing system 340 are described in greater detail below with reference to FIG. 22.

Notably, as explained above, electric faults may occasionally occur within power distribution system 300 and aspects of the present subject matter are directed to systems and methods for mitigating fault currents, e.g., to reduce the likelihood of very high fault that could heat the conductor in the fault path over a period that could lead to complete failure of the system or even fire. For purposes of explanation, a line-to-line AC fault 320 is identified in FIG. 3 between electric machine 302 and power converter 310. However, it should be appreciated that aspects of the present subject matter are also applicable to situations where the fault 320 occurs within electric machine 302 or at other locations within power distribution system 300.

Specifically, FIG. 3 illustrates an example fault that may occur within power distribution system 300. For example, this fault is illustrated as occurring between the a and b phases of the three phase AC power supply. However, it should be appreciated that the fault illustrated is only exemplary and is not intended to limit the scope of the present subject matter in any manner. As shown, the electrical machine back electromotive force (EMF) is represented as $E_{mm}$, the electrical machine back EMF outside of the fault is represented as $E_{mc}$ (e.g., zero if fault is outside of the machine), the machine current is represented as $I_m$, the fault current is represented as $I_f$, the converter current is represented as $I_c$, the fault voltage is represented as $V_f$, the fault impedance is represented as $Z_f$, the converter output voltage is represented as $V_c$, the electrical machine side impedance is represented as $Z_m$ (e.g., when fault is internal to machine), and the converter side impedance is represented as $Z_c$.

Using the model illustrated in FIG. 3, the impedance curing a line-to-line (LL) fault may be modeled as shown below. Specifically, the impedance during the fault when viewed from electric machine 302 ($Z_{mL}$) may be represented as follows:

$$Z_{mL} = Z_m + Z_f \| Z_c = Z_m + \frac{Z_f Z_c}{Z_f + Z_c} = \frac{Z_f Z_m + Z_f Z_c + Z_c Z_m}{Z_f + Z_c}. \quad \text{Equation 1}$$

By contrast, the impedance during the fault when viewed from power converter 310 ($Z_{cL}$) may be represented as follows:

$$Z_{cL} = Z_c + Z_f \| Z_m = Z_c + \frac{Z_f Z_c}{Z_f + Z_c} = \frac{Z_f Z_m + Z_f Z_c + Z_c Z_m}{Z_f + Z_m}. \quad \text{Equation 2}$$

Using these equations, the fault current ($I_f$, Equation 3) and the fault voltage ($V_f$, Equation 4) may be represented as follows:

$$I_f = \frac{Z_c}{Z_f Z_m + Z_f Z_c + Z_c Z_m} E_{mm} + \frac{Z_m}{Z_f Z_m + Z_f Z_c + Z_c Z_m}(V_c - E_{mc}); \quad \text{Equation 3}$$

$$V_f = \frac{Z_f Z_c}{Z_f Z_m + Z_f Z_c + Z_c Z_m} E_{mm} + \frac{Z_f Z_m}{Z_f Z_m + Z_f Z_c + Z_c Z_m}(V_c - E_{mc}). \quad \text{Equation 4}$$

As explained in more detail below, exemplary control methods for operating power converter 310 and/or other components of power distribution system 300 are provided below for mitigating fault currents resulting from line-to-line AC fault 320. For example, referring again to exemplary fault 320, an exemplary goal of the present disclosure may be to reduce or eliminate the line-to-line fault current ($I_f$) by reducing the voltage across the fault ($V_f$) by controlling the output voltage of the converter ($V_c$) to be the right amplitude with opposite polarity of the internal voltage of the electric machine ($E_{mm}$). For example, according to an example embodiment, making the voltage across the fault ($V_f$) equal to 0 may be achieved by using the following equation:

$$V_c = E_{mc} - \frac{Z_c}{Z_m} E_{mm}. \quad \text{Equation 5}$$

Accordingly, Equation 5 may generally provide an output voltage ($V_c$) of power converter for reducing or eliminating the line-to-line fault current ($I_f$), the output voltage ($V_c$) being is a function of the voltage of electric machine 302 as well as impedances present within power distribution system 300 (e.g., within electric machine 302 or between electric machine and power converter). Accordingly, the converter output voltage ($V_c$) may be referred to generally herein as the "fault reducing voltage," the "fault canceling voltage," or the like. However, it should be appreciated that according to alternative embodiments, the fault reducing voltage need not be applied by power converter 310, but could instead be provided by any other suitable voltage source or electrical system. If a fault is detected, an ideal cancellation voltage ($V_c$) could be immediately applied by the power converter 310 as the voltage magnitude and phase angle are functions of known system parameters. As described in more detail below, aspects of the present subject matter are directed to how to realize the output voltage (e.g., the "fault reducing voltage" or the "fault canceling voltage") needed to bring down the fault current ($I_f$), e.g., including the magnitude of the output voltage ($V_c$) and the angle at which the output voltage ($V_c$) should be injected.

In addition, as described in more detail below, aspects of the present subject matter also involve setting of the appropriate/optimum value of DC link voltage low enough to bring down the AC line current ripple (and the fault current ripple) but high enough to produce required AC side terminal voltages. Notably, as evident from the equation above, if the fault is closer to electric machine 302, then $Z_m \ll Z_c$, and the desired $V_c$ magnitude may be high such that a higher DC link voltage ($V_{dc}$) may be needed. Although, if the fault is internal to the machine windings, existence of $E_{mc}$ will reduce the desired magnitude of $V_c$. By contrast, if the fault is closer to power converter 310, then $Z_m \gg Z_c$, and the desired $V_c$ magnitude may be low such that a lower converter DC link voltage ($V_{dc}$) may be needed. Notably, selection of the optimum DC link voltage/low DC link voltage can help in reducing fault current ripple and system losses especially when the fault location is closer to power converter 310.

Figure 4:
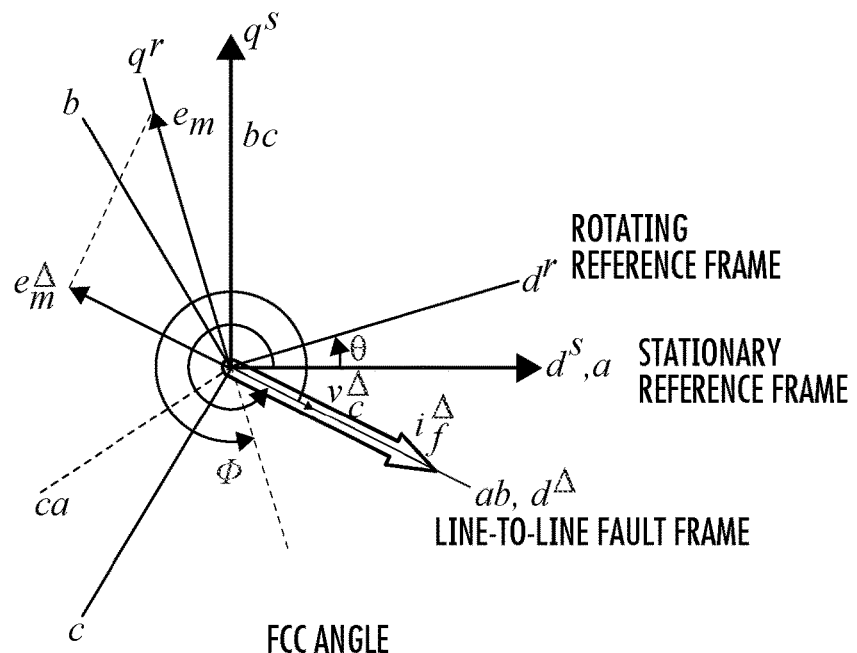
FIG. 4 illustrates a phasor diagram according to exemplary embodiments of the present subject matter.

Referring now briefly to FIG. 4, an example electromotive force (EMF) vector (of which the rotor frame emf vector ($e_m$) and the scalar along the Δ-axis ($e_m^\Delta$) is identified in FIG. 4) is illustrated in various reference frames, e.g., such as a stationary reference frame (denoted by superscript "s"), a rotating reference frame (denoted by superscript "r"), and a line-to-line fault reference frame (denoted by superscript Δ). Also illustrated in FIG. 4 is the converter voltage vector ($v_c$) of power converter 310 in the Δ frame that is needed to cancel the fault current ($I_f$). As explained in more detail below, the representation of these vectors in these reference frames is useful in determining a line-to-line fault current canceling voltage (FCCV), also referred to herein as the "fault reducing voltage," the "fault canceling voltage," or the like. The mathematical derivation and equations for determining the FCCV are provided herein, though it should be appreciated that certain steps may be omitted for brevity. In addition, it should be appreciated that the method described herein is only exemplary and is not intended to limit the scope of the present subject matter, as variations and modifications may be made to this method and these equations while remaining within the scope of the present subject matter.

The back EMF vector of electric machine 302 in the stationary reference frame may be represented as follows:

$$e_m^s = jE_m e^{j\theta}$$ Equation 6:

The back EMF vector of electric machine 302 that appears in the two faulted lines (e.g., in the line-to-line fault reference frame Δ) may be represented as follows:

$$e_m^\Delta = -\sqrt{3} E_m \cos \phi.$$ Equation 7:

In Equation 7, the fault current cancellation angle (φ) is defined as follows, where at φ=0, the back EMF is on the line-to-line fault reference frame at $-d^\Delta$:

$$\phi = \theta - \pi/2 - \Delta.$$ Equation 8:

The back EMF may also be represented as a single-phase phasor as follows:

$$E_m = -E_m.$$ Equation 9:

If the fault is internal to electric machine 302, back EMF can be approximately split into component of machine side EMF (Equation 10) and converter side EMF (Equation 11), where E is a scaling factor that can take values from 0 to 1 based on the location of the fault, as shown below:

$$E_{mm} = (1-\epsilon) E_m$$ Equation 10:

$$E_{mc} = \epsilon E_m.$$ Equation 11:

Ideally, operating power converter 310 to control the output voltage of the converter ($V_c$) according to the following equation will cancel the line-to-line fault current:

$$V_c = -\left\{ E_{mm} \frac{Z_c}{Z_m} - E_{mc} \right\} = -\left\{ (1-\epsilon) \frac{Z_c}{Z_m} - \epsilon \right\} E_m.$$ Equation 12

A fault current cancellation voltage ratio ($K_c$) may be defined as follows:

$$K_c = K_c e^{j\alpha} = \left\{ (1-\epsilon) \frac{Z_c}{Z_m} - \epsilon \right\}.$$ Equation 13

Using this fault current cancellation voltage ratio ($K_c$, also abbreviated FCCVR), the fault current cancelling voltage (FCCV or converter voltage, $V_c$) can be represented as follows:

$$V_c = -K_c E_m = K_c e^{j\alpha} E_m.$$ Equation 14:

Controlling the line-to-line fault current would be achieved with proper adjustment of fault current cancellation voltage ratio ($K_c$), where the magnitude is $K_c$ and angle is α, in the line-to-line voltage of power converter 310 as given below:

$$v_c^\Delta = \sqrt{3} K_c E_m \cos(\phi + \alpha).$$ Equation 15:

The measured fault current can be used to adjust the FCCV. If the measured fault current is a sinusoid with magnitude ($I_f$) and phase angle (γ), it can be represented as shown in Equation 16:

$$i_f^\Delta = I_f \cos(\phi + \gamma).$$ Equation 16:

Fault current could be regulated to zero using various control methods such as various sliding mode control methods, synchronous frame regulation, complex vector regulation, etc. Even though the line-to-line voltage and the fault current are scalar quantities, vector control methods can be utilized to effectively control AC components.

Figure 5:
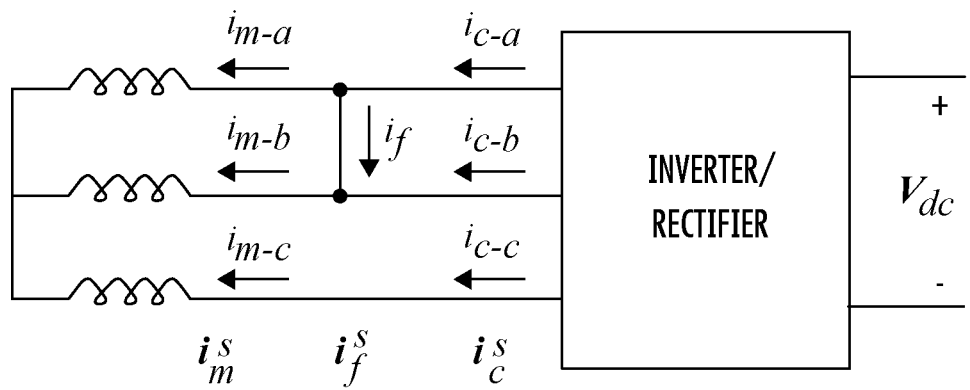
FIG. 5 illustrates a fault current vector representation according to exemplary embodiments of the present subject matter.

Referring now briefly to FIG. 5, a vector representation of the line-to-line fault current is illustrated according to an example embodiment. Differential current measurement is a direct way of getting the fault current where, the fault current may be defined as the difference of converter side current vector and machine side current vector as can be seen in FIG. 3 and represented below:

$$i_{f\text{-}abc}^s = i_{c\text{-}abc}^s - i_{m\text{-}abc}^s;$$ Equation 17A:

$$i_f^s = i_c^s - i_m^s.$$ Equation 17B:

For example, when the line-to-line AC fault is between the A-phase and the B-phase as shown in FIG. 5, the fault current in the stationary reference frame may be represented as follows:

$$i_{f\text{-}abc}^s = \begin{pmatrix} i_f \\ -i_f \\ 0 \end{pmatrix};$$ Equation 18

$$i_f^s = \frac{2}{3} \left( i_{fa} + i_{fb} e^{j\left(\frac{2\pi}{3}\right)} + i_{fc} e^{-j\left(\frac{2\pi}{3}\right)} \right) =$$ Equation 19

$$\frac{2}{3} \left( i_f - i_f e^{j\left(\frac{2\pi}{3}\right)} \right) = \frac{2}{\sqrt{3}} i_f e^{-j\frac{\pi}{6}} = \frac{2}{\sqrt{3}} i_f e^{j\Delta}.$$

Figure 6:
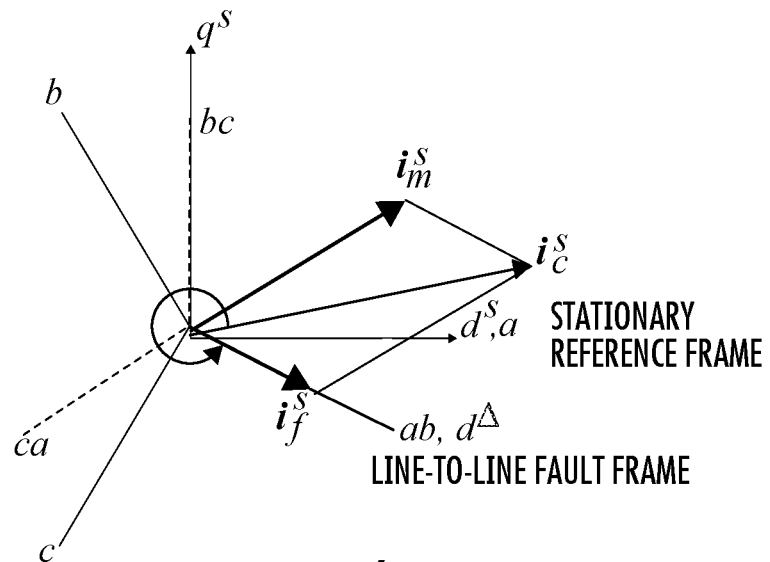
FIG. 6 illustrates a faulted line-to-line reference frame according to exemplary embodiments of the present subject matter.

A complex vector representation of this fault current can be derived as follows, where Δ can be defined as the fault frame angle or the angle of the faulted line-to-line frame as shown in FIG. 6. Specifically, the fault frame angle (Δ) for all three line-to-line fault cases may be −30°/150° for AB-phase fault, −90°/90° for BC-phase fault, and −150°/30° for CA-phase fault.

Figure 7:
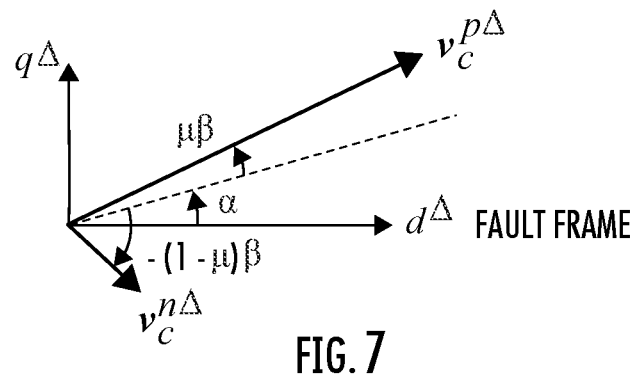
FIG. 7 illustrates a fault frame phasor diagram of the mixed positive and negative sequence injection of a fault current cancellation voltage (FCCV) according to exemplary embodiments of the present subject matter.

Referring now to FIG. 7, a fault frame phasor diagram of the mixed positive and negative sequence injection of the FCCV is provided. FCCV is desired to provide the line-to-line voltage, but it can be generalized to a complex voltage vector and expanded into a mixed injection of positive and negative sequence for line-to-line phase compensation as follows to provide additional control handles to the system. Specifically, Equation 20A represents the complex voltage vector FCCV, Equation 20B represents the positive sequence FCCV, and Equation 20C represents the negative sequence FCCV.

$$v_c^\Delta = v_c^{p\Delta} e^{j\phi} + v_c^{n\Delta} e^{-j\phi};$$ Equation 20A:

$$v_c^{p\Delta} = (1-\mu) v_c e^{j\alpha} e^{j\mu\beta};$$ Equation 20B:

$$v_c^{n\Delta} = \mu v_c e^{-j\alpha} e^{j(1-\mu)\beta}.$$ Equation 20C:

According to example embodiments, this mixed injection voltage will result in a desired line-to-line FCCV. The resultant complex vector voltage of the converter output terminals is represented as follows:

$$v_c^\Delta = (1-\mu) v_c e^{j\alpha} e^{j\mu\beta} e^{j\phi} + \mu v_c e^{-j\alpha} e^{j(1-\mu)\beta} e^{-j\phi}.$$ Equation 21:

The fault frame FCCV d-axis voltage can be derived as:

$$v_{c\text{-}d}^\Delta = v_c[(1-\mu)\cos(\phi+\alpha+\mu\beta) + \mu\cos(\phi+\alpha-(1-\mu)\beta)] \approx v_c \cos(\phi+\alpha).$$ Equation 22:

This enables independent control of positive sequence angle μβ while achieving line-to-line FCCV $v_c \cos(\phi+\alpha)$, resulting decoupled control of fault current (using $v_c$ and α) and converter power (using μ and β). The fault frame voltage $v_c^\Delta$ can be converted to stationary frame voltage vector (e.g., the voltage that the power converter will realize at its output terminals) using the following equation:

$$v_c^s =$$ Equation 23

$$v_c^\Delta e^{j\Delta} = v_c^{p\Delta} e^{j(\theta-\frac{\pi}{2})} + v_c^{n\Delta} e^{-j(\theta-\frac{\pi}{2}-2\Delta)} = -v_c^{p\Delta} j e^{j\theta} + j v_c^{n\Delta} e^{j2\Delta} e^{-j\theta}.$$

Figure 8:
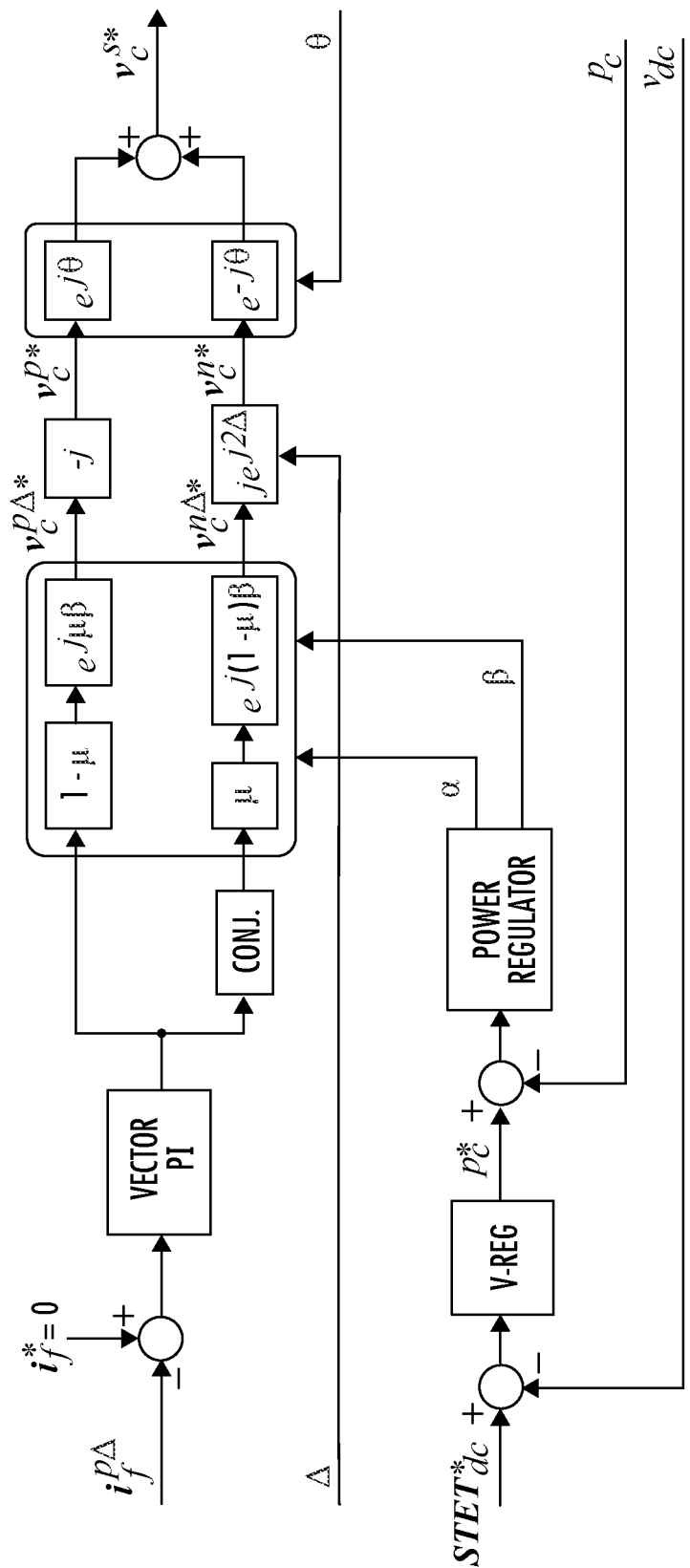
FIG. 8 illustrates a control method that may be used to regulate operation of the exemplary power generation-distribution system of FIG. 3 according to exemplary embodiments of the present subject matter.

Referring now to FIG. 8, a control block diagram for the mixed positive and negative sequence injection of the FCCV is provided. Specifically, FIG. 8 shows the unified control block diagram that enables FCCV generation by blending positive and negative sequence voltages. The objective of the control scheme is to independently control the fault current and converter power. The fault current is minimized by adjusting the magnitude and phase angle of the fault current cancelling voltage. For example, the vector PI controller may drive the fault current to zero by adjusting $v_c$ and α values. The input to the control could be the sequence components of fault current in the fault current frame. This could be derived either from the fault current measurement or from machine side/converter side current measurements which will be explained in more detail below.

For standalone operation of the power converter 310, the DC link voltage is held to the required minimum value by the V-reg controller shown in FIG. 8, that in turn produces the power converter 310 power command. In some scenarios where there is an external source holding DC link, the power regulator can take command from the local/supervisory controller directly, bypassing V-reg. The power control is achieved by adjusting the negative sequence voltage to positive sequence voltage ratio (μ) and the phase angle (β) between positive and negative sequence voltages. μ value is adjusted to a minimum value while meeting the power command. This will help in lowering the ripple in machine torque, converter power and DC link voltage. If β moves out of its defined bounds, μ value is increased to hold the DC link wherein the ripple in converter power and other quantities discussed above increases. From the $v_c$, α, β, μ values, reference voltages in Δ frame ($v_c^{p\Delta*}$, $v_c^{n\Delta*}$) and in the rotor frame is computed ($v_c^{p*}$, $v_c^{n*}$) and later transformed to stationary frame of reference ($v_c^{s*}$).

Figure 9:
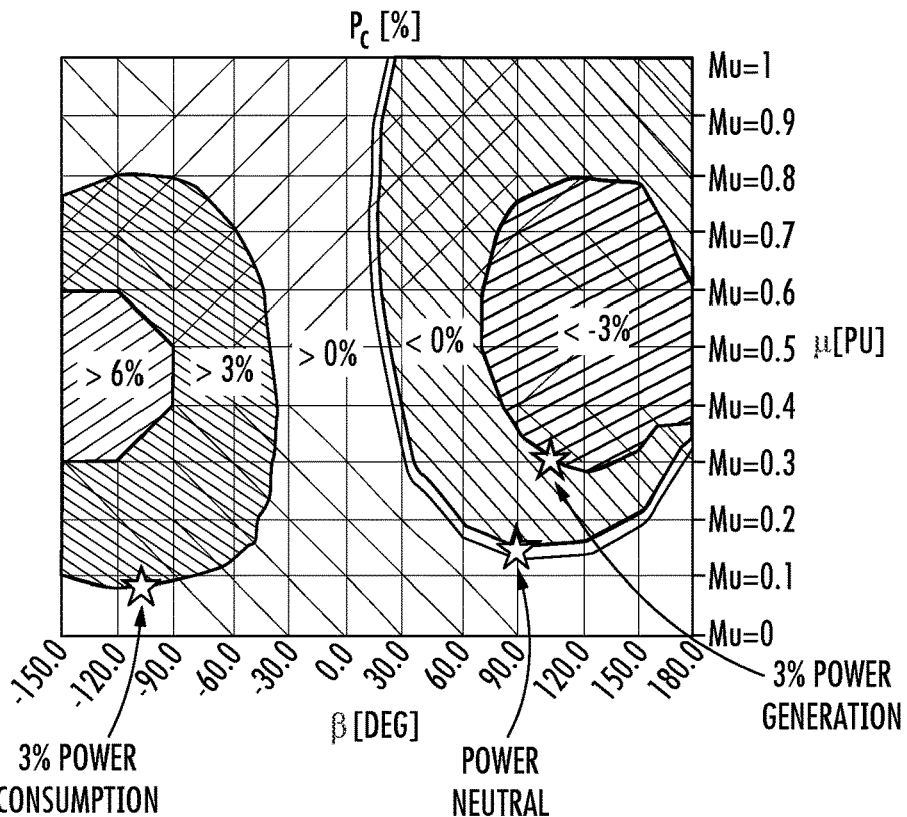
FIG. 9 illustrates a contour plot showing the average converter input power for varying control values according to exemplary embodiments of the present subject matter.
Figure 10:
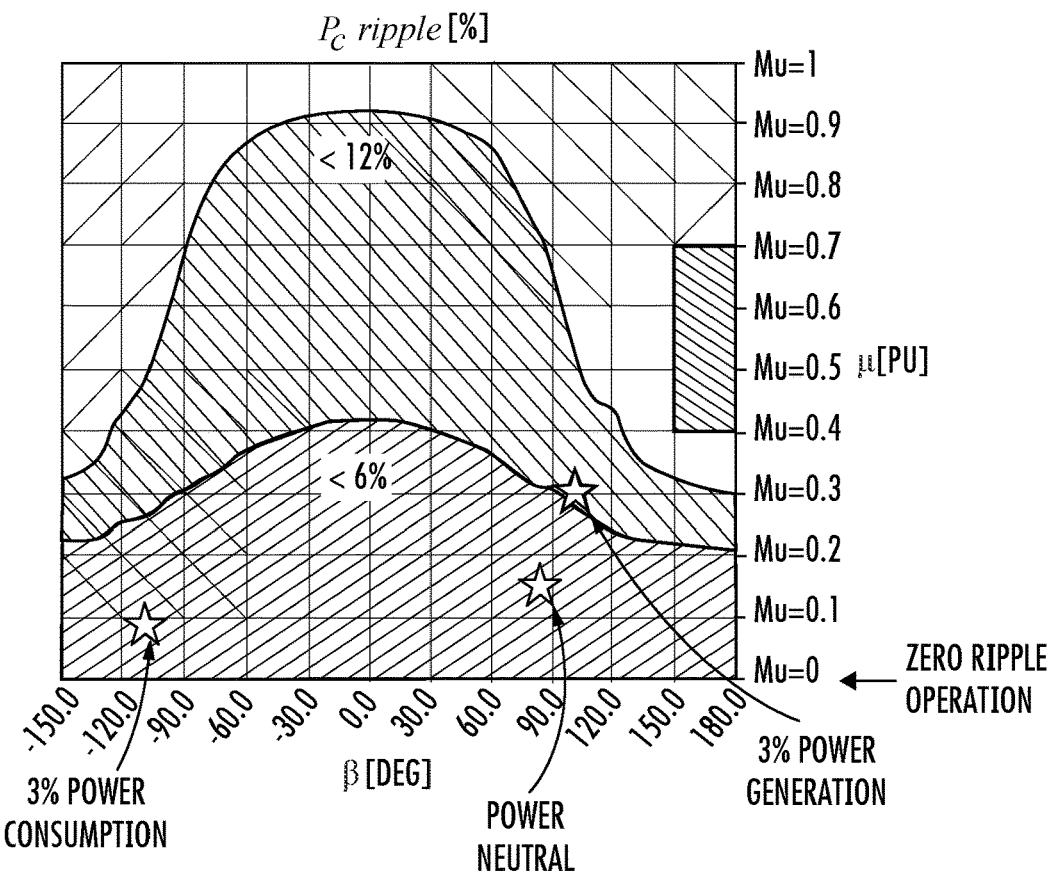
FIG. 10 illustrates a contour plot showing the average converter power ripple percentage for varying control values according to exemplary embodiments of the present subject matter.

Referring now generally to FIGS. 9 and 10, plots of $P_c$ and $P_c$ ripple (%), respectively, are illustrated for varying values of β and μ. The control discussed in FIG. 8 enables the power converter 310 to minimize/eliminate the fault current while achieving different operating modes like the power neutral mode, power flow mode (taking in or giving out a few kilowatts (kWs) of power) or zero power ripple mode by the appropriate selection of β and μ values. These operating modes can be identified from FIGS. 9 and 10. The power neutral mode is the case when the power drawn or supplied by the power converter 310 is zero at the DC link, whereas a few kWs of power is fed to the DC loads connected in generating mode and a few kWs of power is drawn from the DC side to the AC side in power consumption mode. While operating in power neutral mode, as seen in FIGS. 9 and 10, the ripple in converter power is reduced relative to the generating mode. The power ripple is on a higher side for power neutral case when compared to the power consumption mode. The power ripple is higher relative to the power consumption case because the lowest μ value corresponding to the 3% power consumption case is lower than the minimum μ value required for the power neutral operation and the power generation cases. As such, the best system performance in terms of machine torque ripple, DC link voltage ripple, etc., while achieving fault current cancellation, is for the power consumption case (for instance presence of DC side loads that could regenerate or a power supply). Even though the system performance is compromised for the case illustrated, it will enable the power converter 310 to serve small loads that are critical to the system like the control power, cooling pumps etc. by injecting more negative sequence voltage.

Figure 17:
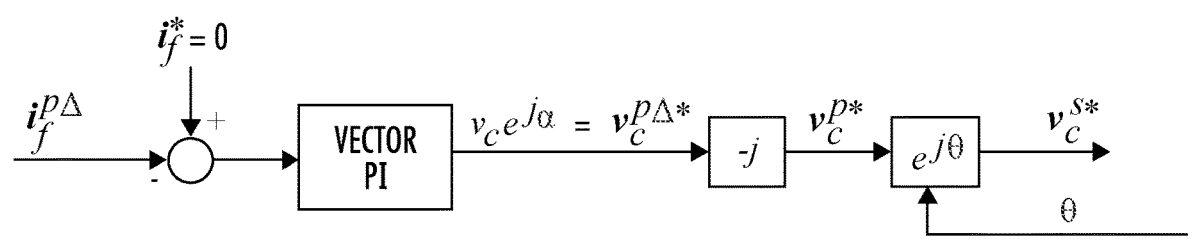
FIG. 17 illustrates a block diagram for a control algorithm that injects only positive sequence voltage according to exemplary embodiments of the present subject matter.
Figure 19:
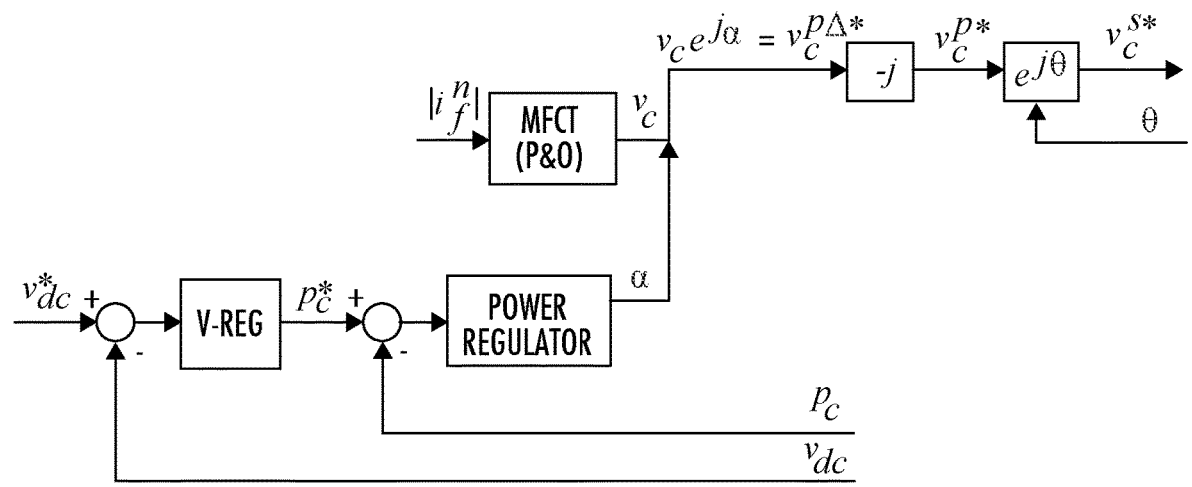
FIG. 19 illustrates a block diagram for a control algorithm that implements minimum fault current tracking (MFCT) for fault current control according to exemplary embodiments of the present subject matter.

Zero ripple operation is achieved with zero μ value. This is a special case where the power converter 310 injects only positive sequence voltage. As can be seen from FIG. 9, power neutral mode and fault current cancellation cannot be achieved together by keeping μ=0. For achieving fault current cancellation with zero ripple in power, the power converter 310 will operate in power consumption mode with power drawn from the DC bus. The control logic for this is shown in FIG. 17. With μ=0, power neutral and power flow modes could be achieved only by compromising the fault current control performance. Fault current reduction is feasible in that case whereas the complete elimination is not. The control logic for that case is shown in FIG. 19. Positive sequence voltage injection by power converter in power neutral mode and power flow mode and FIG. 17 and FIG. 19 are covered in a later section of this document.

If the power converter 310 has an external source holding the DC link, the power converter 310 can also operate in power control mode ignoring the outer voltage loop. The power command can come from the converter controller or any external controller including the supervisory controller. From FIGS. 9 and 10, multiple μ values can give the same $P_c$ value. The control logic is set in such a way as to output the minimum μ value to ensure the ripple in $P_c$ is minimum.

Figure 11:
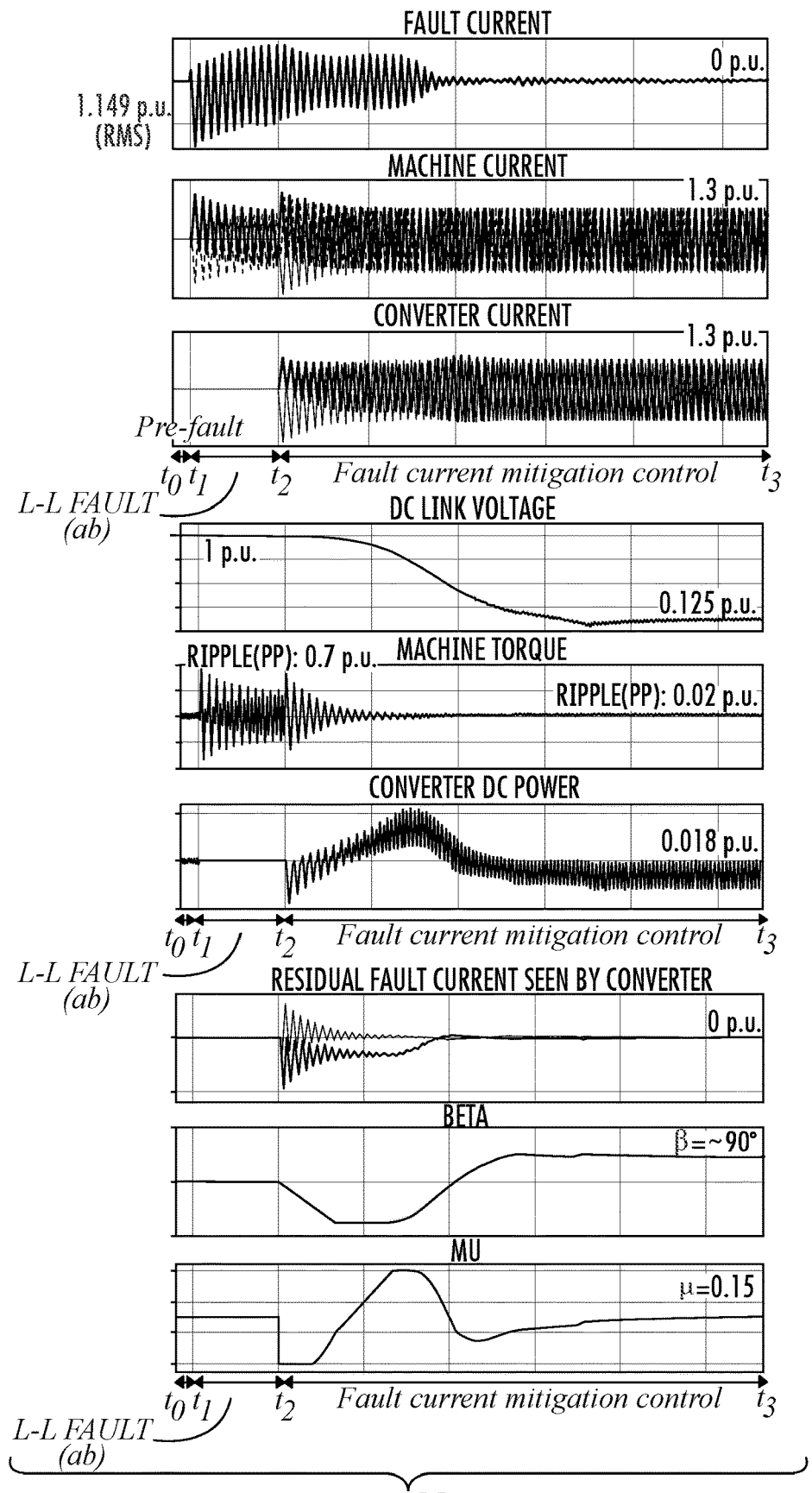
FIG. 11 illustrates plots of various operating parameters of the exemplary power generation-distribution system of FIG. 3 when implementing the exemplary control method of FIG. 8 according to exemplary embodiments of the present subject matter.

FIG. 11 illustrates the plots taken after implementing the control discussed in FIG. 8. From the time instant $t_0$ to $t_1$, the power converter 310 is on no-load and an AC L-L fault in AB is simulated at time instant $t_1$. This condition could trips the power converter 310 resulting in an open circuit. From FIG. 11 it can be seen that the fault current is rising to 1.149 per unit (p.u), creating significant unbalance in machine current. The machine will continue feeding the fault with zero contribution from the power converter 310 till $t_2$. From FIG. 11, machine torque is seen oscillating due to the unbalanced current flow in the machine. At time instant $t_2$, the fault current mitigation control discussed in this application is enabled. From $t_2$, the power converter 310 starts regulating its terminal voltage to $v_c^\Delta$ or FCCV which reduces the fault current and the unbalance in machine and converter currents to zero. Since the machine currents become balanced, the machine torque oscillations will also go down to zero. The DC link voltage, which was held at 1 p.u. pre-fault, is brought down to a minimum required value that is just enough to build FCCV at converter terminals. In this specific example, the DC link voltage was decreased to 0.125 p.u. In this specific case, since the load on the power converter 310 is zero, only the power converter 310 loss of approximately 0.018 p.u is drawn from the machine making it a power neutral system. The β value gets saturated to its limit value as the power converter 310 power cannot be brought down to zero with zero negative sequence injection or with μ value of zero. The control will hence increase the value from its desired value of 0 to 0.15 to hold the DC link voltage to its reference value. These details are captured in FIG. 11.

Figure 12:
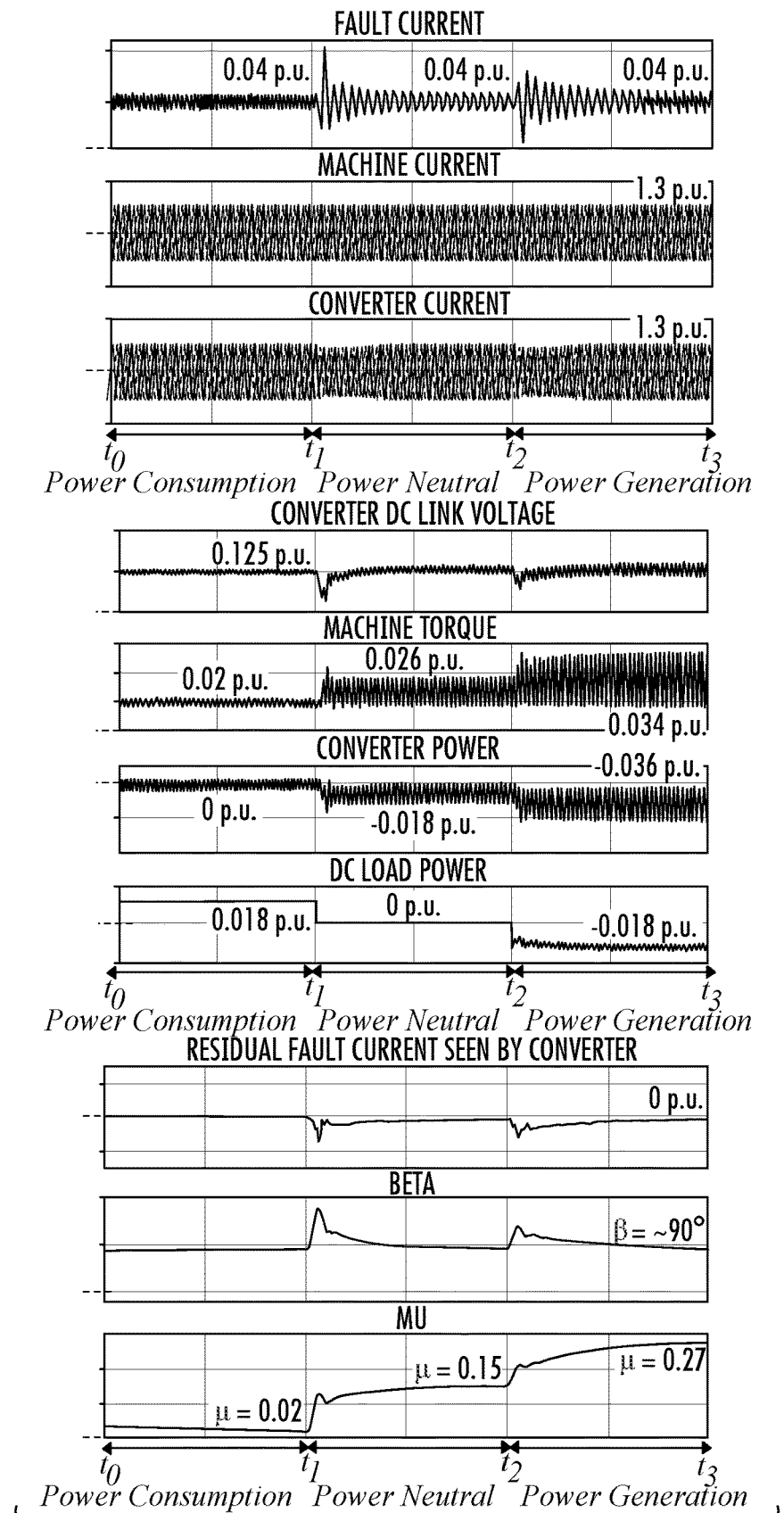
FIG. 12 illustrates plots of various operating parameters of the exemplary power generation-distribution system of FIG. 3 when implementing the exemplary control method of FIG. 8 according to exemplary embodiments of the present subject matter.

Referring now to FIG. 12, the ripple performance of machine torque, converter power and DC voltage is illustrated for the system for varying DC power injection to the DC link of the power converter 310. Power consumption, power neutral and power generation cases discussed in FIGS. 9 and 10 is captured during $t_0$ to $t_1$, $t_1$ to $t_2$, $t_2$ to $t_3$ time instances respectively. The fault current is eliminated in all the cases as shown in FIG. 12 except for the switching ripple flowing to the fault. It could be seen that the ripple performance deteriorates as we traverse from left to right of FIG. 12. Ripple in DC link voltage, converter power, and machine torque is seen increasing in FIG. 12. This is because the required μ value or the negative sequence voltage blending in FCCV is increasing as we move from power consumption case to power generation case. FIG. 12 captures the variation of β and μ values while keeping the residual fault current seen by the power converter 310 to its desired value of 0 p.u.

According to example embodiments, fault current estimation may be achieving using a single location current measurement, while the algorithm can be adjusted depending on the sensor location as will be described in more detail below. Specifically, Equation 24A represents the converter side currents in sequence phasor components and Equation 24B represents the machine side currents in sequence phasor components:

$$i_c^s = i_c^p e^{j\theta} + i_c^n e^{-j\theta}.$$ Equation 24A:

$$i_m^s = i_m^p e^{j\theta} + i_m^n e^{-j\theta}$$ Equation 24B:

Equation 25 provides the fault current sequence phasor components:

$$i_f^s = i_f^p e^{j\theta} + i_f^n e^{-j\theta} = (i_c^p - i_m^p) e^{j\theta} + (i_c^n - i_m^n) e^{-j\theta}.$$ Equation 25:

If the fault current is eliminated and if the system is balanced, the negative sequence current on both converter side and the machine side should be zero ($i_c^n = 0$ and $i_m^n = 0$). Therefore, the fault current can be controlled indirectly by controlling the negative sequence currents either on the converter side or on the machine side.

Figure 13:
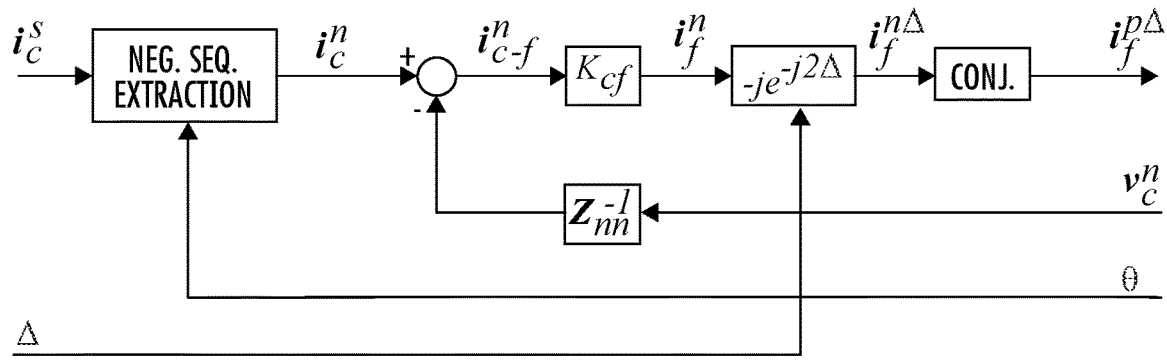
FIG. 13 illustrates a block diagram for extracting a converter side current with residual negative sequence correction according to exemplary embodiments of the present subject matter.
Figure 14:
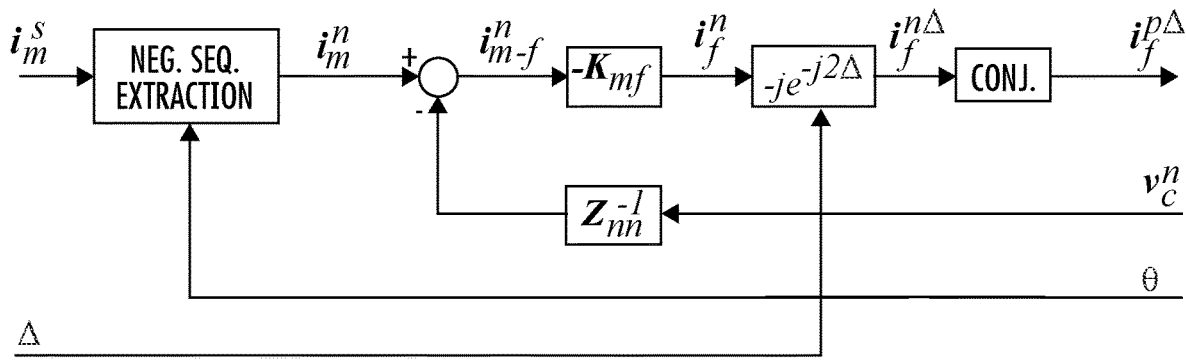
FIG. 14 illustrates a block diagram for extracting a machine side current with residual negative sequence correction according to exemplary embodiments of the present subject matter.
Figure 15:
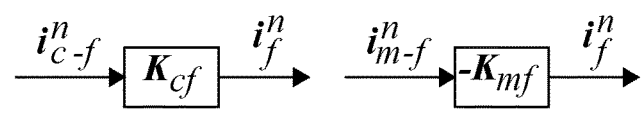
FIG. 15 illustrates a block diagram for deriving fault current from the machine side and converter side currents according to exemplary embodiments of the present subject matter.

Referring now to FIGS. 13 and 14, a more direct control scheme will be derived to mitigate fault current in the faulted frame from the negative sequence converter side or the machine side currents. Specifically, FIGS. 13 and 14 show block diagrams for extracting the positive sequence of fault current in faulted frame ($i_f^{p\Delta}$) from converter side and machine side currents, respectively, in the stationary frame ($i_c^s$ and $i_m^s$). The negative sequence extraction block extracts the negative sequence components ($i_c^n$ and $i_m^n$) of $i_c^s$ and $i_m^s$. Mixed injection of positive and negative sequences by the power converter 310 is represented by Equation 26 (below), in which $i_c^n$ and $i_m^n$ have components because of the negative sequence voltage ($v_c^n$) injection and due to fault. Accordingly, FIGS. 13 and 14 provide for estimating the fault current from a single current sensor on the converter side (FIG. 13) or the machine side (FIG. 14). These figures thus generate values for $i_f^{p\Delta}$, with inputs including $v_c^n$ and θ:

$$v_c^s = v_c^p e^{j\theta} + v_c^n e^{-j\theta}.$$ Equation 26:

The negative sequence of converter current under ideal fault current cancellation condition can be represented by Equation 27:

$$i_{c(ideal)}^n = Z_{nn}^{-1} v_c^n$$ Equation 27:

This will give the residual negative sequence current or in other words the negative sequence converter current caused by the line-to-line fault as shown in Equation 28:

$$i_{c-f}^n = i_c^n - Z_{nn}^{-1} v_c^n.$$ Equation 28:

If the system has unbalanced current ($I_{norm}^n$) under normal operation due unbalance in the system, this current can be further subtracted from the measured negative sequence current $i_c^n$, as shown in Equation 29:

$$i_{c-f}^n = i_c^n Z_{nn} v_c^n - I_{norm}^n$$ Equation 29:

Using the same approach, machine side residual negative sequence currents $i_{m-n}^n$ can be estimated as in FIG. 14. The residual negative sequence current is a measure of fault current and is scaled with a factor ($K_{cf}$ and $K_{mf}$) to derive the negative sequence of fault current (17) as shown in FIG. 15.

From FIG. 3, the negative sequence frame voltage and current vectors may be related by:

$$v_c^n e^{-j\theta} = i_c^n e^{-j\theta} Z_c + i_m^n e^{-j\theta} Z_m + e_m^n e^{-j\theta}.$$ Equation 30:

For a balanced machine, $e_m^n = 0$ and considering a case where the negative sequence voltage injected by the power converter 310 is minimum or even zero, the above equation will be:

$$i_c^n Z_c + i_m^n Z_m = 0;$$ Equation 31:

$$\frac{i_c^n}{i_m^n} = -\frac{Z_m}{Z_c}.$$ Equation 32

From Equations 25 and 32, the fault current negative sequence vector can be written as:

$$i_f^n = i_c^n \left(1 + \frac{Z_c}{Z_m}\right);$$ Equation 33

$$i_f^n = i_m^n \left(-\frac{Z_m}{Z_c} - 1\right).$$ Equation 34

$K_{cf}$ and $K_{mf}$ used in FIG. 13 and FIG. 14 are hence given by Equations 36 and 36, as shown below:

$$K_{cf} = \left(1 + \frac{Z_c}{Z_m}\right);$$ Equation 35

$$K_{mf} = \left(1 + \frac{Z_m}{Z_c}\right).$$ Equation 36

From the control block diagram shown in FIG. 8, fault current in fault frame is used to derive the converter voltage references in the faulted frame. Below transformations will help in deriving $i_f^{p\Delta}$ from $i_f^n$. The fault current with phase angle γ which is represented by Equation 16 can be represented as the fault current complex vector in the fault frame as:

$$i_f^\Delta = \frac{2}{\sqrt{3}} I_f \cos(\phi + \gamma).$$ Equation 37

The fault current could be represented with sequence components in reference to FCC angle ϕ as:

$$i_f^\Delta = i_f^{p\Delta} e^{j\theta} + i_f^{n\Delta} e^{-j\theta};$$ Equation 38:

$$i_f^{p\Delta} = \frac{I_f}{\sqrt{3}} e^{j\gamma};$$ Equation 39A $$i_f^{n\Delta} = \frac{I_f}{\sqrt{3}} e^{-j\gamma}. \quad \text{Equation 39B}$$

In Equations 38-39B, $i_f^{p\Delta}$ and $i_f^{n\Delta}$ represent the complex vector in the positive and negative sequence fault frames. To derive sequence components in reference to rotor angle θ, the fault frame complex vectors are rotated by Δ as shown in Equation 40:

$$i_f^s = \quad \text{Equation 40A}$$

$$i_f^\Delta e^{j\Delta} = (i_f^{p\Delta} e^{j\phi} + i_f^{n\Delta} e^{-j\phi}) e^{j\Delta} = i_f^{p\Delta} e^{j(\theta - \frac{\pi}{2})} + i_f^{n\Delta} e^{-j(\theta - \frac{\pi}{2} - 2\Delta)};$$

$$i_f^s = -j i_f^{p\Delta} e^{j\theta} + j i_f^{n\Delta} e^{j2\Delta} e^{-j\theta}; \quad \text{Equation 40B}$$

$$i_f^s = i_f^p e^{j\theta} + i_f^n e^{-j\theta}. \quad \text{Equation 40C}$$

From Equation 40, the positive sequence component (Equation 41) and the negative sequence component (Equation 42) of the fault current in the rotor frame may be derived as follows:

$$i_f^p = -j i_f^{p\Delta} = j \frac{I_f}{\sqrt{3}} e^{j\gamma}; \quad \text{Equation 41}$$

$$i_f^n = j i_f^{n\Delta} e^{j2\Delta} = j \frac{I_f}{\sqrt{3}} e^{-j\gamma} e^{j2\Delta}. \quad \text{Equation 42}$$

From Equation 42, the fault current negative sequence component in fault frame is given by:

$$i_f^{n\Delta} = -j i_f^n e^{-j2\Delta}. \quad \text{Equation 43}$$

From Equations 41 and 42, the fault current positive sequence component in fault frame is given as follows, where ( )* represents the complex conjugate of a complex vector:

$$i_f^{p\Delta} = (i_f^{n\Delta})^*. \quad \text{Equation 44}$$

Both rotor frame sequence components as given by Equations 41 and 42 include fault current magnitude information ($I_f$). The phase angle γ is measurable from positive sequence and the fault frame angle Δ is measurable from both sequences. Sequence components can be extracted using frame transformation and proper filtering including methods such as SOGI (second order generalized integrator). This control scheme could be implemented by using a fault current regulator taking in either $i_f^{p\Delta}$ or $i_f^{n\Delta}$ as the feedback and by using $v_c^{p\Delta}$ and $v_c^{n\Delta}$ as the output.

Figure 16:
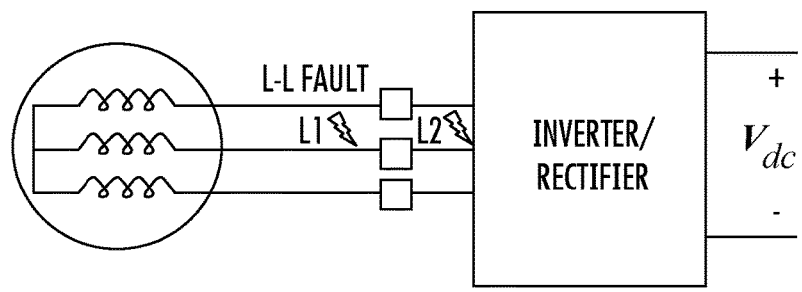
FIG. 16 illustrates a sensor location for measuring fault current according to exemplary embodiments of the present subject matter.

Referring now to FIG. 16, fault current measurement at a single location is illustrated. Specifically, the location of the three-phase current sensor could be anywhere between the converter output terminals and the machine neutral terminals. Based on the location of the fault relative to the sensor, fault detection and mitigation strategies may be different. For example, two cases may be considered, including: Case 1—a line-to-line fault on the AC terminals outside of sensor and Case 2—a line-to-line fault between the sensor and the power converter 310.

First considering Case 1, where an AC line-to-line fault happens outside of the current sensor (marked as L1) in FIG. 16, the sensed currents can go higher than the set protection limits, and the power converter 310 can trip. Depending on the location and impedance of the fault and on the voltage level across the faulted lines, the fault current may rapidly increase to a detectable level or even to a level that requires overcurrent protection, or it may slowly increase to a detectable level. This may take less than a control cycle or may take multiples of control cycles. The sensed currents can not only be used for the detection of fault but also can be used to determine the lines in which the fault has happened and hence determine Δ which is needed for control as per FIG. 8. If the fault current is large enough, the deviation of measured current compared to predicted current (commanded or expected) can be used to detect the lines of fault. However, if the fault current is not large enough, some signal processing might be desirable. Once the faulty lines are detected, Δ values (as provided above) could be used for control. The tripped converter could be reset, and active fault current mitigation control could be initiated.

Now considering Case 2, where an AC line-to-line fault happens between the sensor and the power converter 310 (marked as L2) in FIG. 16, the power converter 310 could trip instantaneously before the sensed currents reach the detectable level or can trip when the sensed currents reach detectable levels. This is dependent on the location of fault and sensor. If the fault happens within the power converter 310, irrespective of the sensor location (machine side/converter side), the sensed currents won't have information regarding fault or Δ before the trip. Once it trips, the faulty phases will have the fault current flowing in it and hence, we could directly determine the lines in which the fault has happened. If the fault is away from the power converter 310 with the current sensor location anywhere between the fault and machine neutral, the sensed current can have information regarding the fault location and A as discussed in the previous section.

In cases where the power converter 310 trips before detecting Δ, after the trip reset, the power converter 310 can first go to three phase short circuit mode to bring down the fault current. The effectiveness of three phase SC could be determined by monitoring the negative sequence components of the sensed currents. For scenarios where the fault is within the power converter 310, the negative sequence components of the sensed currents will come down to zero. For cases in which the negative sequence components of the sensed currents are not zero, active mitigation control could be initiated after Δ detection.

FIG. 17 shows the control block diagram for a case in which only positive sequence voltage $v_c^{p\Delta}$ is injected. This is derived from the control logic discussed in FIG. 8 by keeping μ=0 (e.g., as there is no power control loop, μ=0 and the required power is taken from the DC source). In other words, FIG. 17 illustrates a control method where the power control loop is removed and the negative sequence injection is eliminated. Here, the DC link is held by an external power supply connected via contactor 1 or contactor 2 as shown in FIG. 3. Injecting positive sequence voltage alone has advantages of bringing the fault current to zero with no pulsation in torque/converter power. But in this case, converter losses will be taken from the DC link (external source connected) and will operate in power consumption mode.

Figure 18:
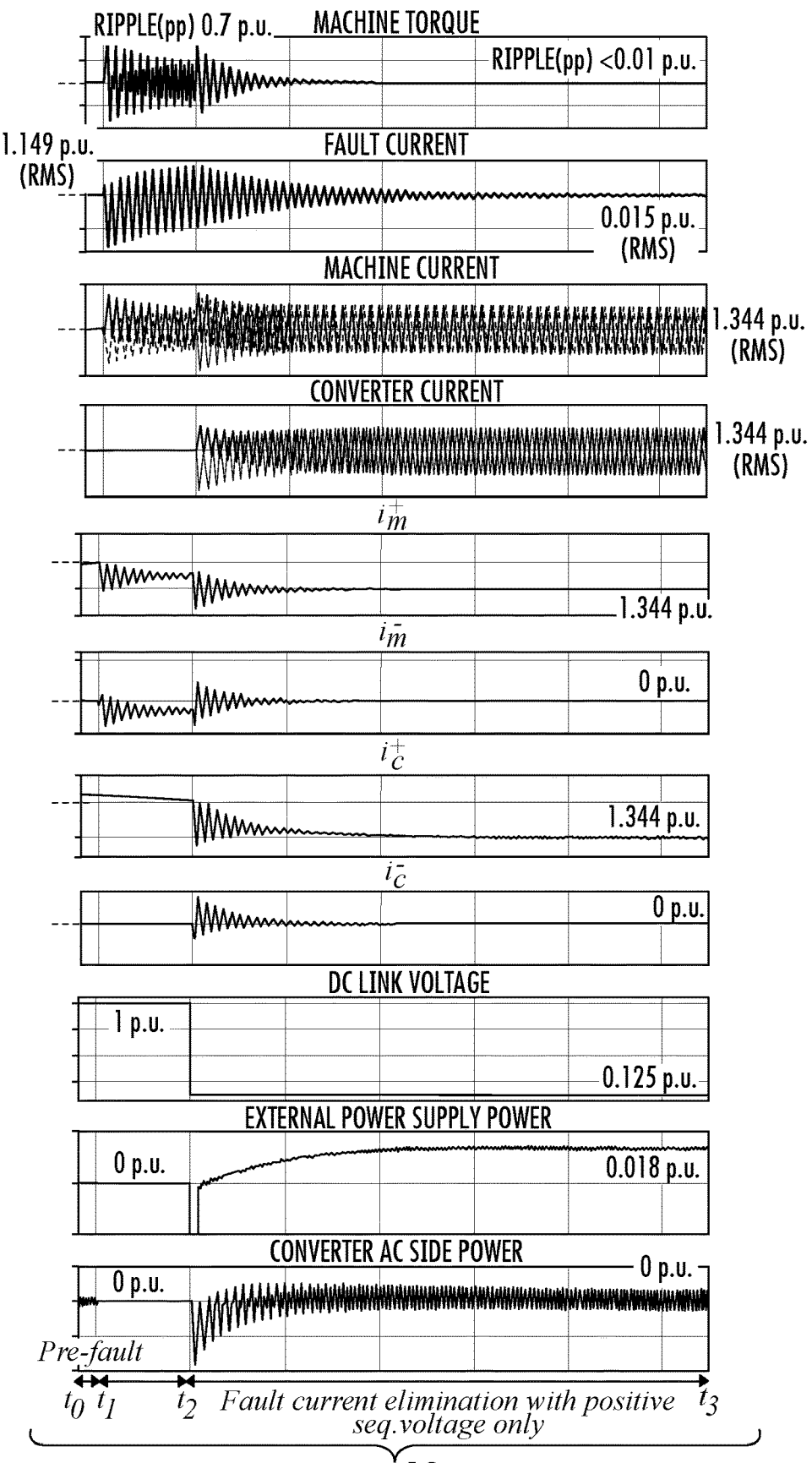
FIG. 18 illustrates plots of various operating parameters of the exemplary power generation-distribution system of FIG. 3 when implementing the exemplary control method of FIG. 17 according to exemplary embodiments of the present subject matter.

FIG. 18 shows the simulation results after implementing control as per FIG. 17. The behavior during pre-fault condition and till the time instant $t_2$ is same as FIG. 11. Fault current mitigation control with this scheme yields zero pulsation in torque, and converter power as can be seen from FIG. 18. The machine currents and the converter currents are balanced and equal which will make their positive sequence components in rotor frame ($i_m^+$, $i_c^+$) equal and negative sequence components in rotor frame ($i_m^-$, $i_c^-$) zero. The DC link is held by an external source with a commanded voltage of 0.125 p.u, with the converter losses of 0.018 p.u is supplied by the same.

Referring now briefly to FIG. 19, a closed loop feedback control algorithm, e.g., such as a minimum fault current tracking (MFCT) control method using positive sequence voltage injection for fault current control, will be described. This MFCT algorithm may generate a voltage magnitude ($v_c$) to bring down the fault current, represented by $|i_f^n|$. Specifically, for getting a power neutral system with positive sequence injection alone, the DC link voltage regulator V-reg of FIG. 8 is retained that give out the angle of fault current cancelling voltage ($\alpha$). In this case $\mu\beta=0$ and the only control handle for regulating fault current is the magnitude of the converter voltage ($v_c$). The magnitude of the fault current $i_f^n$ is minimized by varying $v_c$. The MFCT control block shown in FIG. 19 implements perturb and observe logic in it by perturbing $v_c$, and observing the magnitude of $i_f^n$. It will finally settle to a $v_c$ value that creates minimum fault current flow. It should be appreciated that any other suitable search algorithm may be used to determine $v_c$. If the DC link voltage is held by and external supply/system, the power regulator can bypass the voltage regulator output command and take power command directly from the converter controller or any external controller including the supervisory controller. In that case, the power converter 310 can as well operate in power flow mode either taking in or giving out power.

Figure 20:
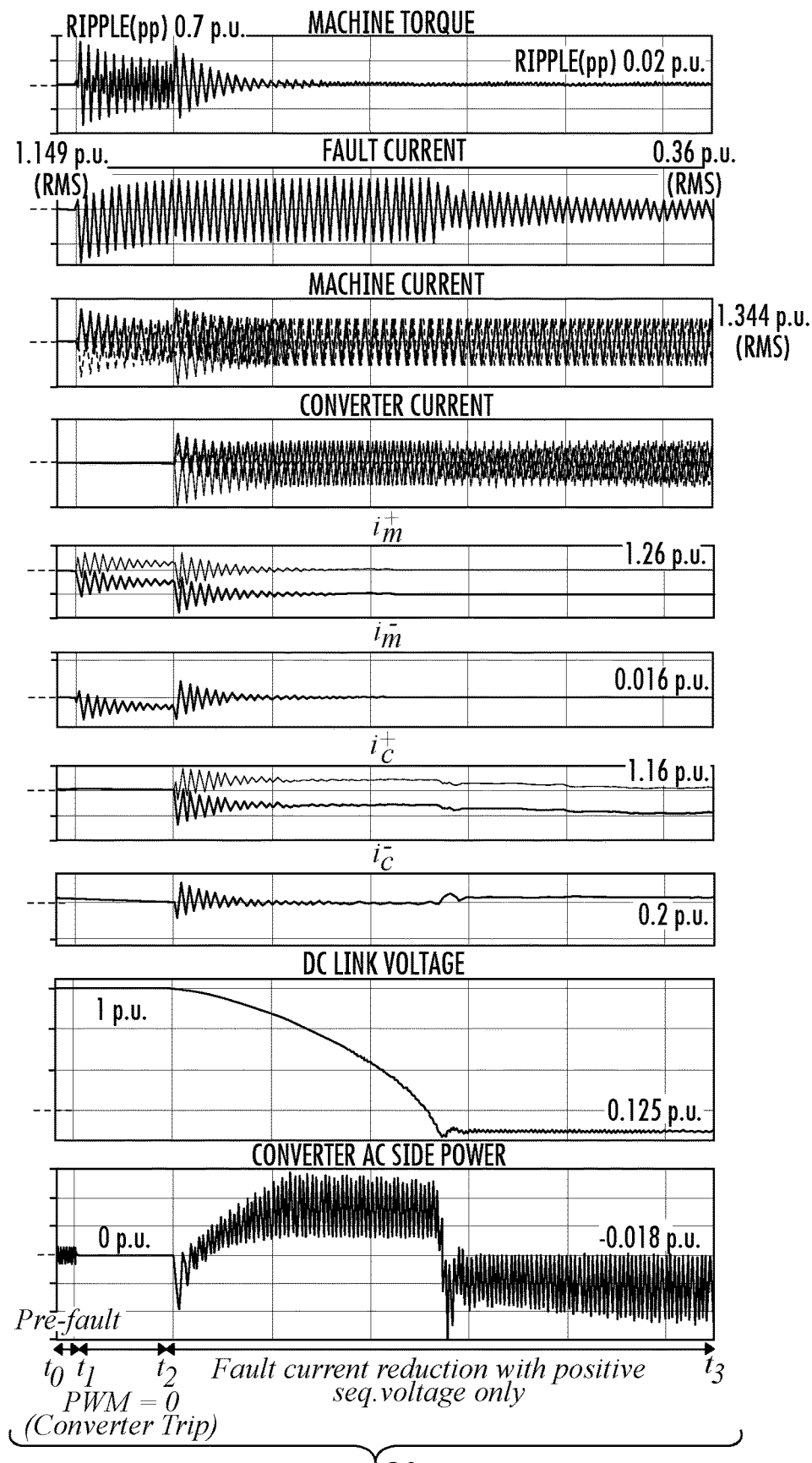
FIG. 20 illustrates plots of various operating parameters of the exemplary power generation-distribution system of FIG. 3 when implementing the exemplary control method of FIG. 19 according to exemplary embodiments of the present subject matter.
Figure 21:
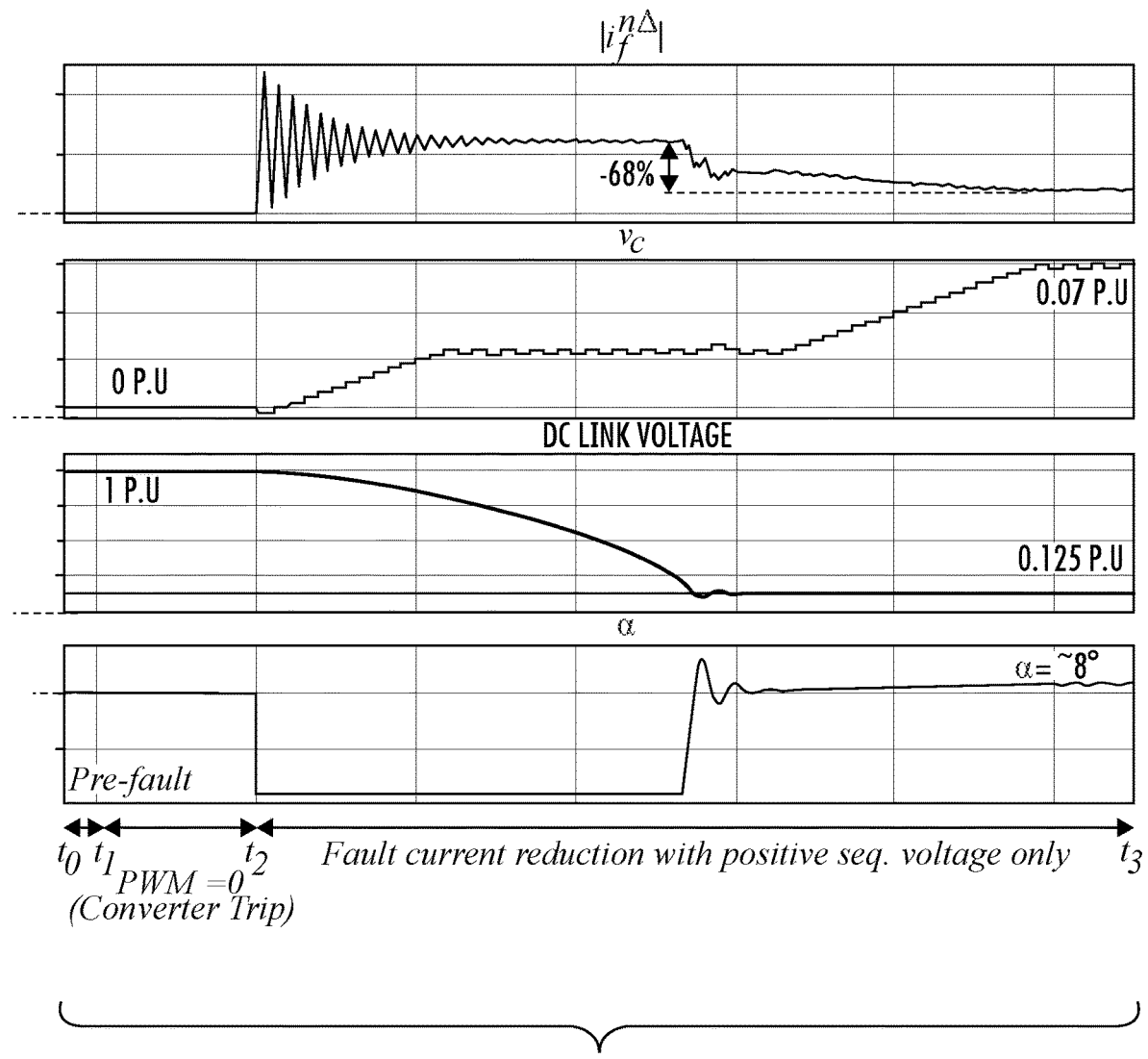
FIG. 21 illustrates plots of various operating parameters of the exemplary power generation-distribution system of FIG. 3 when implementing the exemplary control method of FIG. 19 according to exemplary embodiments of the present subject matter.

FIG. 20 shows the simulation results after implementing the control in FIG. 19 Like previous case, the behavior during pre-fault condition and till the time instant $t_2$ is same as FIG. 11. Once the fault current reduction control is initiated at $t_2$, the fault current drops from 1.149 pu to 0.36 pu as the complete elimination is not possible here. Due to this, the unbalance in machine and converter currents will continue to exist making the negative sequence components ($i_m^-$, $i_c^-$) non-zero with continued oscillations in machine torque, converter power and DC link voltage. FIG. 21 shows the variation of $|i_f^n|$ and $V_{dc}$ for the variations of control variables $v_c$ and $\alpha$. Once $\alpha$ settles to its final value by regulating the DC bus to the commanded value of 0.125 p.u, the control will gradually perturb $v_c$ to bring down the fault current.

FIG. 22 illustrates a system diagram of computing system 340 of power distribution system 300 of FIG. 3. The computing elements described herein can include one, some, or all the components of computing system 340 and can execute operations as described below.

As shown in FIG. 22, computing system 340 includes one or more computing device(s) 350. The computing devices, controllers, etc. described herein may embody one or more of the components of the computing device 350. The computing device(s) 350 can include one or more processor(s) 350A and one or more memory device(s) 350B. The one or more processor(s) 350A can include any processing device, such as a microprocessor, microcontroller, integrated circuit, logic device, and/or other suitable processing device. The one or more memory device(s) 350B can include one or more computer-readable media, including, but not limited to, non-transitory computer-readable media, RAM, ROM, hard drives, flash drives, and/or other memory devices.

The one or more memory device(s) 350B can store information accessible by the one or more processor(s) 350A, including computer-executable or computer-readable instructions 350C that can be executed by the one or more processor(s) 350A. The instructions 350C can be any set of instructions that when executed by the one or more processor(s) 350A, cause the one or more processor(s) 350A to perform operations. In some embodiments, the instructions 350C can be executed by the one or more processor(s) 350A to cause the one or more processor(s) 350A to perform operations, such as any of the operations and functions for which the computing system 340 and/or the computing device(s) 350 are configured. The instructions 350C can be software written in any programming language or can be implemented in hardware. Additionally, and/or alternatively, the instructions 350C can be executed in logically and/or virtually separate threads on processor(s) 350A. The memory device(s) 350B can further store data 350D that can be accessed by the processor(s) 350A.

The computing device(s) 350 can also include a network interface 350E used to communicate, for example, with the other components of system 340 (e.g., via a network). The network interface 350E can include components for interfacing with one or more network(s), including for example, transmitters, receivers, ports, controllers, antennas, and/or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

As explained herein, AC line-to-line faults between a power converter and a Permanent Magnet Synchronous Generator (PMSG) (or within the machine itself) may cause fault current to flow between the faulted terminals. This could lead to heating the conductor in the fault path over a period that could lead to complete failure of the system or even fire. Once approach to overcome this hazardous situation is to mechanically disconnect the generator shaft from the prime mover as it can prevent the PMSG from feeding the fault. This may be achieved, for example, by disconnecting the electrical machine terminals from the cable using a switch such as a contactor or a circuit breaker (not capable of mitigating internal fault of the electrical machine). In multi-channel generator systems, shaft mechanical disconnection may make the system less reliable as the fault tolerant capability provided by the other winding sets may also be impacted.

Accordingly, aspects of the present subject matter are directed to a control solution that could bring down the fault current to acceptable values (or even eliminate the fault current) without needing to engage the shaft mechanical disconnect (shaft cutter, clutch, etc.). This may reduce the number of fault conditions that lead to the mechanical disconnect engagement being a necessity. Multiple control schemes are proposed, each providing certain technical and commercial advantages over prior art solutions. Examples of such advantages are provided below, though it should be appreciated that other advantages of the present subject matter would be apparent to one having ordinary skill in the art.

An example advantage of the present subject matter may include the reduction or complete elimination of problems associated with AC side line-to-line faults, such as heating, arcing, fire, and explosion. In addition, the number of fault conditions that might otherwise necessitate a mechanical disconnect may be reduced. Machine torque oscillations may be reduced in steady state as the unbalance in machine currents is reduced. Moreover, the proposed system and method may not require any additional sensors and dual channel operation of both electric machine and power converter may ensure that the redundancy that is provided by the second set of windings may not be affected even in the presence of fault.

Figure 23:
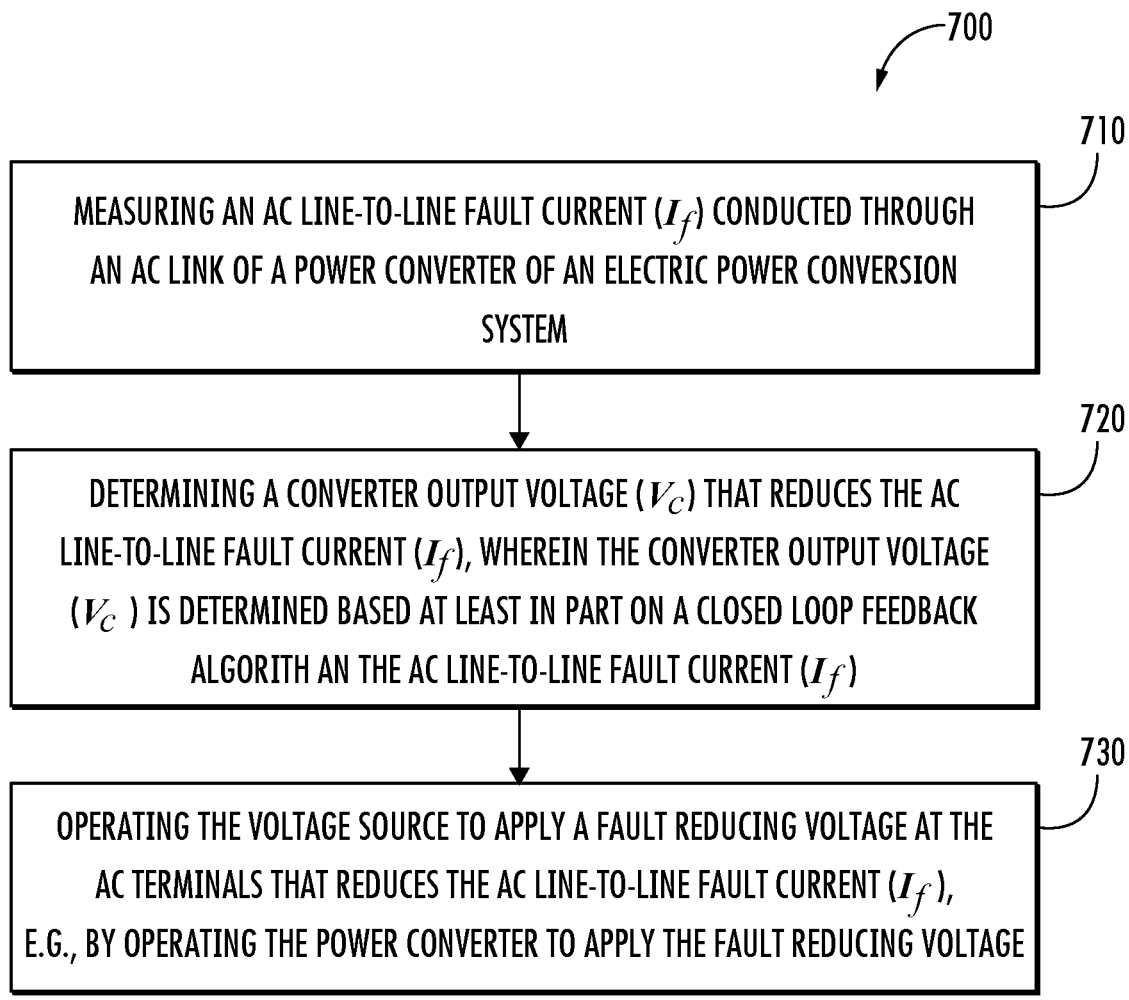
FIG. 23 illustrates a control method that may be used to regulate operation of the exemplary power generation-distribution system of FIG. 3 according to exemplary embodiments of the present subject matter.

Referring now briefly to FIG. 23, an exemplary method 700 for regulating operation of power converter 310 in the event of a line-to-line AC fault 320 is described. Notably, method 800 may include many steps similar to those described above with respect to methods 400, 500, and 600. Accordingly, repeated discussion of these steps is omitted here for brevity. However, it should be appreciated that portions of methods 400, 500, 600, and 700 may be interchangeable to form further methods of operation that are deemed to fall within the scope of the present subject matter.

As noted above, FIG. 23 illustrates method 700 of operating an electric power conversion system, the electric power conversion system comprising an alternating current (AC) source or electric machine for generating or receiving AC power, a direct current (DC) power bus and a power converter electrically coupling the AC source or the electric machine and the DC power bus. Method 800 includes, at step 710, measuring an AC line-to-line fault current ($I_f$) conducted through an AC link of a power converter of an electric power conversion system.

Step 720 includes determining a converter output voltage ($V_c$) that reduces the AC line-to-line fault current ($I_f$), wherein the converter output voltage ($V_c$) is determined based at least in part on a closed loop feedback algorithm and the AC line-to-line fault current ($I_f$). According to an example embodiment, determining the converter output voltage ($V_c$) that reduces the AC line-to-line fault current ($I_f$) includes: determining a measured fault frame fault current vector ($i_f^\Delta$) from the AC line-to-line fault current ($I_f$); determining a positive sequence fault frame converter voltage ($v_c^{p\Delta}$) and a negative sequence fault frame converter voltage ($v_c^{n\Delta}$) based at least in part on the measured fault current vector ($i_f^\Delta$); determining a fault frame angle ($\Delta$) measured between a stationary reference frame and a fault reference frame; and determining a target positive sequence converter voltage ($v_c^{p*}$) and a target negative sequence converter voltage ($v_c^{n*}$) based at least in part on the positive sequence fault frame converter voltage ($v_c^{p\Delta}$), the negative sequence fault frame converter voltage ($v_c^{n\Delta}$), and the fault frame angle ($\Delta$).

Step 730 includes operating the voltage source to apply a fault reducing voltage at the AC terminals that reduces the AC line-to-line fault current ($I_f$), e.g., by operating the power converter to apply the fault reducing voltage.

Further aspects are provided by the subject matter of the following clauses:

An electric power conversion system comprising: an alternating current (AC) source comprising a plurality of AC terminals for conducting AC power; a voltage source electrically coupled to the AC terminals; and a controller operably coupled to the voltage source, the controller being configured to: operate the voltage source to apply a fault reducing voltage at the AC terminals that reduces an AC line-to-line fault current ($I_f$).

The electric power conversion system of any preceding clause, wherein the voltage source comprises: a power bus for conducting bus power; and a power converter comprising an AC link electrically coupled to the AC terminals of the AC source and a bus link electrically coupled to the power bus, the power converter being configured for converting between the AC power and the bus power.

The electric power conversion system of any preceding clause, wherein operating the voltage source to apply the fault reducing voltage comprises operating the power converter to apply the fault reducing voltage.

The electric power conversion system of any preceding clause, further comprising an external power source electrically coupled to the power bus and the power converter, wherein the controller is further configured to: operate the external power source to provide a bus voltage at the bus link of the power converter 310 to permit the power converter to maintain the fault reducing voltage at the AC link of the power converter.

The electric power conversion system of any preceding clause, wherein the controller is in operative communication with the external power source, the controller being configured to: operate the power converter and the external power source to independently manipulate the AC line-to-line fault current ($I_f$) and an input power to the power converter.

The electric power conversion system of any preceding clause, wherein the controller is operably coupled to the power converter, the controller further being configured to: measure the AC line-to-line fault current ($I_f$) conducted through the AC link of the power converter; and determine a converter output voltage ($V_c$) that reduces the AC line-to-line fault current ($I_f$), wherein the fault reducing voltage is the converter output voltage ($V_c$).

The electric power conversion system of any preceding clause, wherein the converter output voltage ($V_c$) is determined based at least in part on a closed loop feedback algorithm and the AC line-to-line fault current ($I_f$).

The electric power conversion system of any preceding clause, wherein the converter output voltage ($V_c$) that reduces the AC line-to-line fault current ($I_f$) is determined using the following equation:

$$V_c = E_{mc} - \frac{Z_c}{Z_m} E_{mm}.$$

where: $E_{mc}$ is a fault voltage outside of the electric machine;
$E_{mm}$ is an internal voltage or back EMF of the electric machine;
$Z_c$ is an electrical converter side impedance; and
$Z_m$ is an electrical machine side impedance.

The electric power conversion system of any preceding clause, wherein determining the converter output voltage ($V_c$) that reduces the AC line-to-line fault current ($I_f$) comprises: determining a measured fault frame fault current vector ($i_f^\Delta$) from the AC line-to-line fault current ($I_f$); determining a positive sequence fault frame converter voltage ($v_c^{p\Delta}$) and a negative sequence fault frame converter voltage ($v_c^{n\Delta}$) based at least in part on the measured fault current vector ($i_f^\Delta$); determining a fault frame angle ($\Delta$) measured between a stationary reference frame and a fault reference frame; and determining a target positive sequence converter voltage ($v_c^{p*}$) and a target negative sequence converter voltage ($v_c^{n*}$) based at least in part on the positive sequence fault frame converter voltage ($v_c^{p\Delta}$), the negative sequence fault frame converter voltage ($v_c^{n\Delta}$), and the fault frame angle ($\Delta$).

The electric power conversion system of any preceding clause, further comprising: a load electrically coupled to the power bus for conducting the bus power from the power bus.

The electric power conversion system of any preceding clause, wherein the power bus is a direct current (DC) power bus for conducting DC power and the bus link is a DC link electrically coupled to the DC power bus, the power converter being configured for converting between the AC power and the DC power.

The electric power conversion system of any preceding clause, wherein the fault reducing voltage is a positive sequence voltage and the voltage source regulates a magnitude and an angle of the positive sequence voltage.

The electric power conversion system of any preceding clause, wherein the fault reducing voltage is a negative sequence voltage.

The electric power conversion system of any preceding clause, wherein the fault reducing voltage is a positive sequence voltage and a negative sequence voltage, and wherein the voltage source regulates a ratio of the negative sequence voltage to positive sequence voltage ($\mu$) and a phase angle ($\beta$) between the positive sequence voltage and the negative sequence voltage.

The electric power conversion system of any preceding clause, wherein the phase angle ($\beta$) and the ratio of the negative sequence voltage to positive sequence voltage ($\mu$) are determined using a power control loop including a power control regulator using an input of a bus side converter voltage and a converter power ($p_c$).

The electric power conversion system of any preceding clause, wherein the power control loop drives the ratio of the negative sequence voltage to positive sequence voltage ($\mu$) to zero.

The electric power conversion system of any preceding clause, wherein the AC source is an electric machine operable in both a motoring mode and a generating mode.

A method of operating an electric power conversion system, the electric power conversion system comprising an alternating current (AC) source comprising a plurality of AC terminals for conducting AC power and a voltage source electrically coupled to the AC terminals, the method comprising: operating the voltage source to apply a fault reducing voltage at the AC terminals that reduces an AC line-to-line fault current ($I_f$).

The method of any preceding clause, wherein the voltage source comprises a power bus for conducting bus power and a power converter comprising an AC link electrically coupled to the AC terminals of the AC source and a bus link electrically coupled to the power bus, the power converter being configured for converting between the AC power and the bus power, and wherein operating the voltage source to apply the fault reducing voltage comprises operating the power converter to apply the fault reducing voltage.

The method of any preceding clause, further comprising: measuring the AC line-to-line fault current ($I_f$) conducted through the AC link of the power converter; and determining a converter output voltage ($V_c$) that reduces the AC line-to-line fault current ($I_f$), wherein the fault reducing voltage is the converter output voltage ($V_c$).

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. An electric power conversion system comprising:
   an alternating current (AC) source comprising a plurality of AC terminals for conducting AC power;
   a voltage source electrically coupled to the AC terminals; and
   a controller operably coupled to the voltage source, the controller being configured to:
   operate the voltage source to apply a fault reducing voltage ($V_c$) at the AC terminals that reduces an AC line-to-line fault current ($I_f$), wherein the fault reducing voltage ($V_c$) is determined using the following equation:

$$V_c = E_{mc} - Z_c/Z_m E_{mm},$$

where: $E_{mc}$ is a fault voltage outside of the AC source;
$E_{mm}$ is an internal voltage or back EMF of the AC source;
$Z_c$ is an electrical converter side impedance; and
$Z_m$ is an electrical machine side impedance.

2. The electric power conversion system of claim 1, wherein the voltage source comprises:
   a power bus for conducting bus power; and
   a power converter comprising an AC link electrically coupled to the AC terminals of the AC source and a bus link electrically coupled to the power bus, the power converter being configured for converting between the AC power and the bus power.

3. The electric power conversion system of claim 2, wherein operating the voltage source to apply the fault reducing voltage ($V_c$) comprises operating the power converter to apply the fault reducing voltage ($V_c$).

4. The electric power conversion system of claim 2, further comprising an external power source electrically coupled to the power bus and the power converter, wherein the controller is further configured to:
   operate the external power source to provide a bus voltage at the bus link of the power converter to permit the power converter to maintain the fault reducing voltage ($V_c$) at the AC link of the power converter.

5. The electric power conversion system of claim 4, wherein the controller is in operative communication with the external power source, the controller being configured to:
   operate the power converter and the external power source to independently manipulate the AC line-to-line fault current ($I_f$) and an input power to the power converter.

6. The electric power conversion system of claim 2, wherein the controller is operably coupled to the power converter, the controller further being configured to:
   measure the AC line-to-line fault current ($I_f$) conducted through the AC link of the power converter; and
   determine a converter output voltage ($V_c$) that reduces the AC line-to-line fault current ($I_f$), wherein the fault reducing voltage ($V_c$) is the converter output voltage ($V_c$).

7. The electric power conversion system of claim 6, wherein the converter output voltage ($V_c$) is determined based at least in part on a closed loop feedback algorithm and the AC line-to-line fault current ($I_f$).

8. The electric power conversion system of claim 6, wherein determining the converter output voltage ($V_c$) that reduces the AC line-to-line fault current ($I_f$) comprises:
- determining a measured fault frame fault current vector ($i_f^\Delta$) from the AC line-to-line fault current ($I_f$);
- determining a positive sequence fault frame converter voltage ($v_c^{p\Delta}$) and a negative sequence fault frame converter voltage ($v_c^{n\Delta}$) based at least in part on the measured fault current vector ($i_f^\Delta$);
- determining a fault frame angle ($\Delta$) measured between a stationary reference frame and a fault reference frame; and
- determining a target positive sequence converter voltage ($v_c^{p*}$) and a target negative sequence converter voltage ($v_c^{n*}$) based at least in part on the positive sequence fault frame converter voltage ($v_c^{p\Delta}$), the negative sequence fault frame converter voltage ($v_c^{n\Delta}$), and the fault frame angle ($\Delta$).

9. The electric power conversion system of claim 2, further comprising:
- a load electrically coupled to the power bus for conducting the bus power from the power bus.

10. The electric power conversion system of claim 2, wherein the power bus is a direct current (DC) power bus for conducting DC power and the bus link is a DC link electrically coupled to the DC power bus, the power converter being configured for converting between the AC power and the DC power.

11. The electric power conversion system of claim 1, wherein the fault reducing voltage ($V_c$) is a positive sequence voltage and the voltage source regulates a magnitude and an angle of the positive sequence voltage.

12. The electric power conversion system of claim 1, wherein the fault reducing voltage ($V_c$) is a negative sequence voltage.

13. The electric power conversion system of claim 1, wherein the fault reducing voltage ($V_c$) is a positive sequence voltage and a negative sequence voltage, and wherein the voltage source regulates a ratio of the negative sequence voltage to positive sequence voltage ($\mu$) and a phase angle ($\beta$) between the positive sequence voltage and the negative sequence voltage.

14. The electric power conversion system of claim 13, wherein the phase angle ($\beta$) and the ratio of the negative sequence voltage to positive sequence voltage ($\mu$) are determined using a power control loop including a power control regulator using an input of a bus side converter voltage and a converter power ($p_c$).

15. The electric power conversion system of claim 14, wherein the power control loop drives the ratio of the negative sequence voltage to positive sequence voltage ($\mu$) to zero.

16. The electric power conversion system of claim 1, wherein the AC source is an electric machine operable in both a motoring mode and a generating mode.

17. A method of operating an electric power conversion system, the electric power conversion system comprising an alternating current (AC) source comprising a plurality of AC terminals for conducting AC power and a voltage source electrically coupled to the AC terminals, the method comprising:
- measuring an AC line-to-line fault current ($I_f$) conducted through the AC link of the power converter; and
- operating the voltage source to apply a fault reducing voltage ($V_c$) at the AC terminals that reduces the AC line-to-line fault current ($I_f$), wherein the fault reducing voltage ($V_c$) is determined using the following equation:

$$V_c = E_{mc} - Z_c/Z_m E_{mm},$$

where: $E_{mc}$ is a fault voltage outside of the AC source;
$E_{mm}$ is an internal voltage or back EMF of the AC source;
$Z_c$ is an electrical converter side impedance; and
$Z_m$ is an electrical machine side impedance.

18. The method of claim 17, wherein the voltage source comprises a power bus for conducting bus power and a power converter comprising an AC link electrically coupled to the AC terminals of the AC source and a bus link electrically coupled to the power bus, the power converter being configured for converting between the AC power and the bus power, and wherein operating the voltage source to apply the fault reducing voltage ($V_c$) comprises operating the power converter to apply the fault reducing voltage ($V_c$).

19. The method of claim 18, further comprising:
- determining a converter output voltage ($V_c$) that reduces the AC line-to-line fault current ($I_f$), wherein the fault reducing voltage ($V_c$) is the converter output voltage ($V_c$).

* * * * *